May 26, 1964 H. P. LUHN 3,134,163

METHOD FOR WINDING AND ASSEMBLING MAGNETIC CORES

Filed Nov. 21, 1955

19 Sheets-Sheet 1

INVENTOR
HANS P. LUHN

BY Joe L. Koerber
ATTORNEY

May 26, 1964 H. P. LUHN 3,134,163

METHOD FOR WINDING AND ASSEMBLING MAGNETIC CORES

Filed Nov. 21, 1955 19 Sheets-Sheet 2

INVENTOR
HANS P. LUHN

BY Joe L. Koerber
ATTORNEY

May 26, 1964 H. P. LUHN 3,134,163

METHOD FOR WINDING AND ASSEMBLING MAGNETIC CORES

Filed Nov. 21, 1955

19 Sheets-Sheet 4

INVENTOR.
HANS P. LUHN
BY Joe L. Koerber
ATTORNEY

May 26, 1964 H. P. LUHN 3,134,163

METHOD FOR WINDING AND ASSEMBLING MAGNETIC CORES

Filed Nov. 21, 1955 19 Sheets-Sheet 6

INVENTOR
HANS P. LUHN

BY Joe L. Koerber
ATTORNEY

INVENTOR
HANS P. LUHN
BY Joe L. Koerber
ATTORNEY

INVENTOR
HANS P. LUHN

BY Joe L. Koerber
ATTORNEY

METHOD FOR WINDING AND ASSEMBLING MAGNETIC CORES

Filed Nov. 21, 1955 19 Sheets-Sheet 9

GROUP A GROUP B GROUP C GROUP D

METHOD FOR WINDING AND ASSEMBLING MAGNETIC CORES

Filed Nov. 21, 1955

INVENTOR
HANS P. LUHN

BY Joe L. Koerber
ATTORNEY

May 26, 1964 H. P. LUHN 3,134,163

METHOD FOR WINDING AND ASSEMBLING MAGNETIC CORES

Filed Nov. 21, 1955 19 Sheets-Sheet 12

METHOD FOR WINDING AND ASSEMBLING MAGNETIC CORES

Filed Nov. 21, 1955 19 Sheets-Sheet 14

INVENTOR
HANS P. LUHN

BY Joe L. Koerber
ATTORNEY

METHOD FOR WINDING AND ASSEMBLING MAGNETIC CORES

Filed Nov. 21, 1955 19 Sheets-Sheet 15

May 26, 1964 H. P. LUHN 3,134,163

METHOD FOR WINDING AND ASSEMBLING MAGNETIC CORES

Filed Nov. 21, 1955 19 Sheets-Sheet 16

INVENTOR
HANS P. LUHN

BY Joe L. Koerber
ATTORNEY

May 26, 1964 H. P. LUHN 3,134,163

METHOD FOR WINDING AND ASSEMBLING MAGNETIC CORES

Filed Nov. 21, 1955 19 Sheets-Sheet 17

METHOD FOR WINDING AND ASSEMBLING MAGNETIC CORES

Filed Nov. 21, 1955

United States Patent Office 3,134,163
Patented May 26, 1964

3,134,163

METHOD FOR WINDING AND ASSEMBLING MAGNETIC CORES

Hans P. Luhn, Armonk, N.Y., assignor to International Business Machines Corporation, New York, N.Y., a corporation of New York Filed Nov. 21, 1955, Ser. No. 548,131
11 Claims. (Cl. 29—155.5)

This invention relates to methods and apparatus for winding magnetic core arrays and more particularly to automation and mass production of such core arrays.

Magnetic core arrays are becoming increasingly important, for example, in the field of high speed computers. Heretofore, core arrays have been produced by long and tedious hand labor in which the various windings are threaded manually through the very small, individual magnetic cores. That method is extremely tedious, extremely slow, and subject to errors. A single error may nullify several days or even weeks of work.

It is the principal object of this invention to provide an improved method of assembling magnetic core arrays.

Another object of this invention is to provide a method of winding an entire row or column of a core array in a single step.

A further object of this invention is to provide a novel method of inserting windings in a core array whereby the inductive effects of one winding cancel the inductive effects of an adjacent winding.

Still another object of the invention is to provide a method of manipulating groups of cores comprising a single array whereby non-corresponding rows of adjacent groups are aligned for insertion of windings in a pattern whereby the outputs due to the half selection of non-selected cores are self-cancelling.

Yet another object of the invention is to provide a method of manipulating groups of cores comprising a single array whereby one group of cores may be moved into a different plane relative to an adjacent group whereby the windings may be inserted in one group without the physical interference of an adjacent group.

Another object of the invention is to provide a novel support member for a row of magnetic cores.

Yet another object of the invention is to provide a novel support member for a row of magnetic cores adapted for receiving end terminals for connecting certain ones of the core windings, the terminals having configurations and positioning adapted to facilitate the interconnection of adjacent rows of cores, for example, by dip soldering.

A still further object of the invention is to provide a mechanism for automatically inserting a row of cores and certain ones of required windings in a special support member.

Another object of the invention is to provide means for assembling core carrying strips, forming a core array, into a rigid, self-supporting unit.

Other objects of the invention will be pointed out in the following description and claims and illustrated in the accompanying drawings, which disclose, by way of example, the principle of the invention and the best mode, which has been contemplated, of applying that principle.

Figure 6:
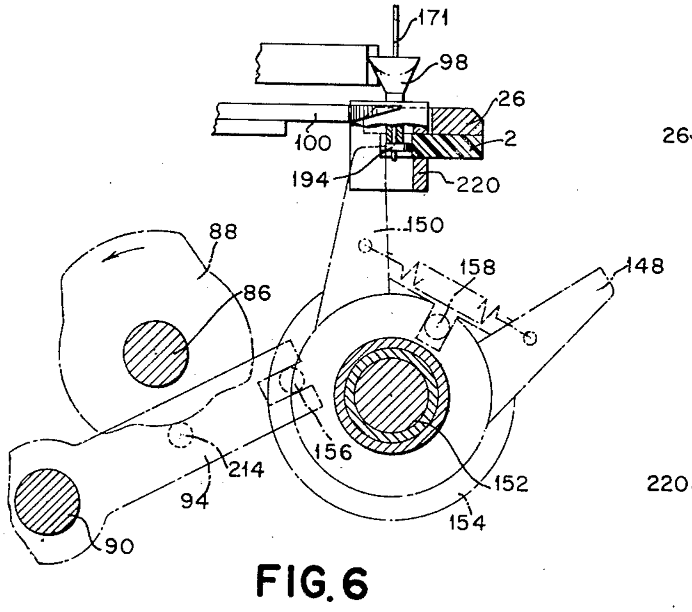
FIG. 6 is a partial view showing an actuated position of part of the mechanism of FIG. 5.
Figure 7:
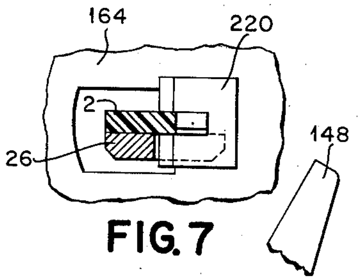
FIG. 7 is a partial view of FIG. 6 with parts rotated 180°.
Figure 7A:
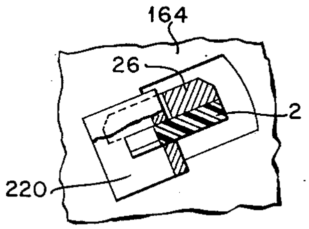

FIG. 7*a* is a partial view of FIG. 6 with parts rotated to an intermediate position.

Figure 9:
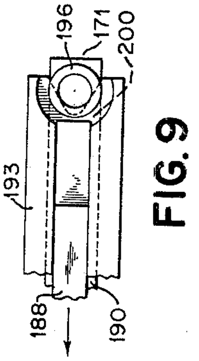
Figure 8:
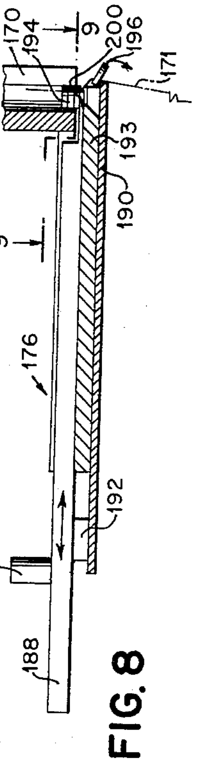

FIGS. 8 and 9 are sectional views of a core feeding mechanism.

FIGS. 10–13 show successive positions of elements during machine operation.

Figure 14:
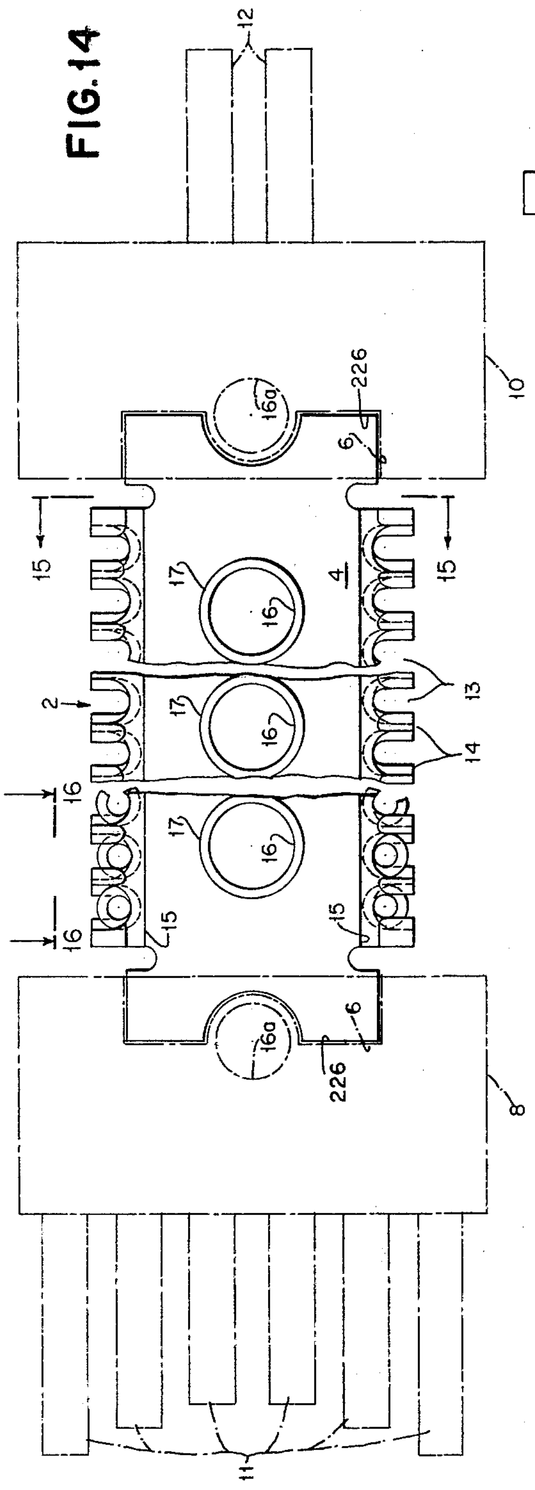

FIG. 14 is a view of the core support member and terminals.

Figure 15:
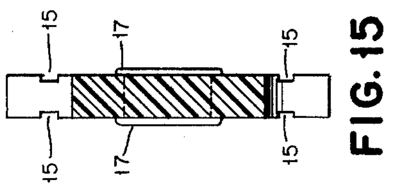

FIG. 15 is a sectional view taken along lines 15—15 in FIG. 14.

Figure 16:
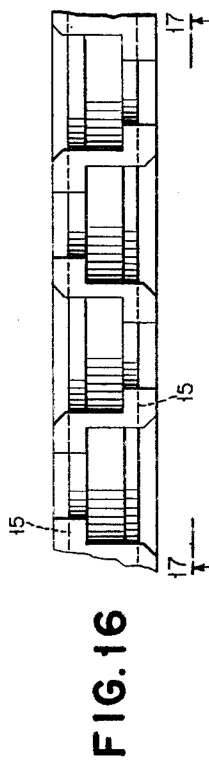

FIG. 16 is an enlarged top view taken along the lines 16—16 in FIG. 14.

Figure 17:
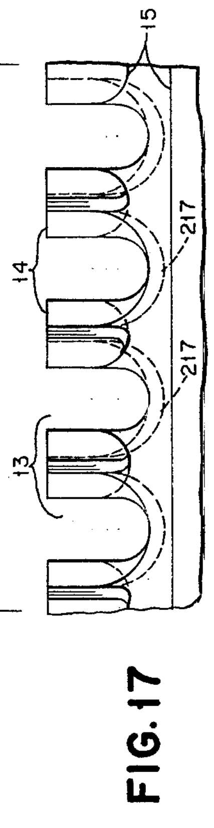

FIG. 17 is a side view taken along lines 17—17 in FIG. 16.

Figures 18, 19:
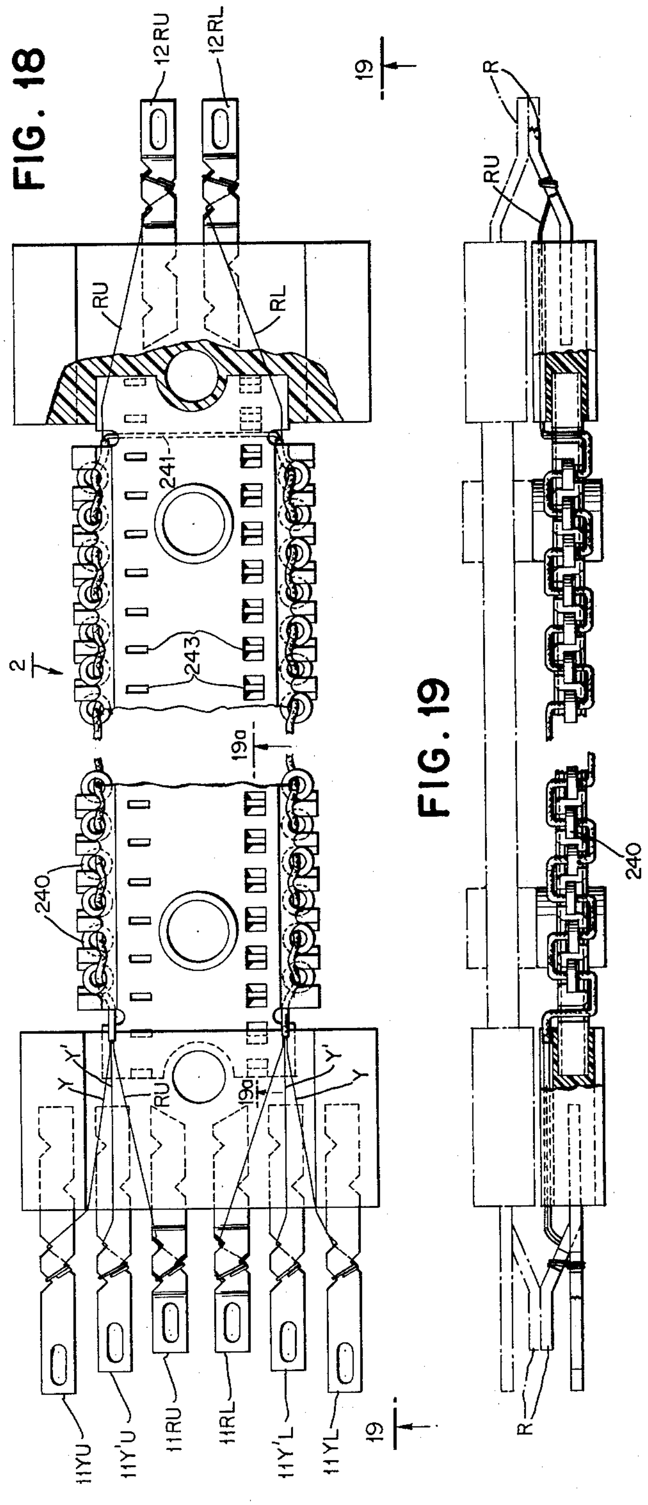

FIG. 18 is a view of a comb member and terminals with three windings per core.

FIG. 19 is a view taken along lines 19—19 of FIG. 18.

Figure 19A:
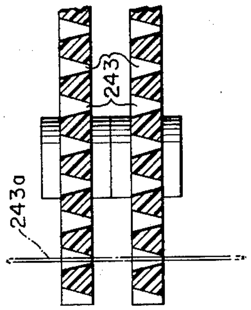

FIG. 19*a* is a sectional view taken along the lines **19*a*—19*a*** in FIG. 18.

Figure 20:
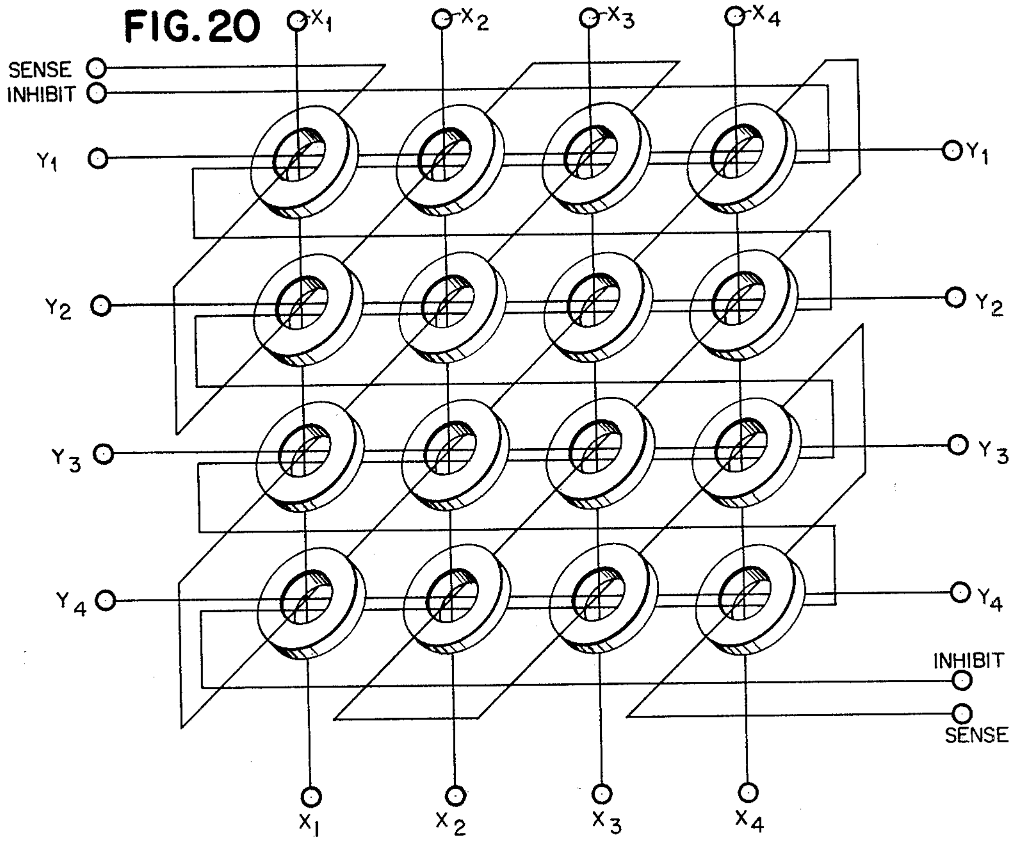

FIG. 20 is a schematic representation of a conventional core memory.

FIGS. 21–29 show successive steps in assembling a particular core memory.

Figure 30:
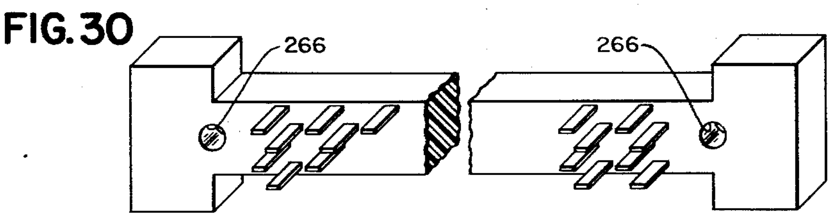

FIG. 30 shows a terminal block.

Figure 31:
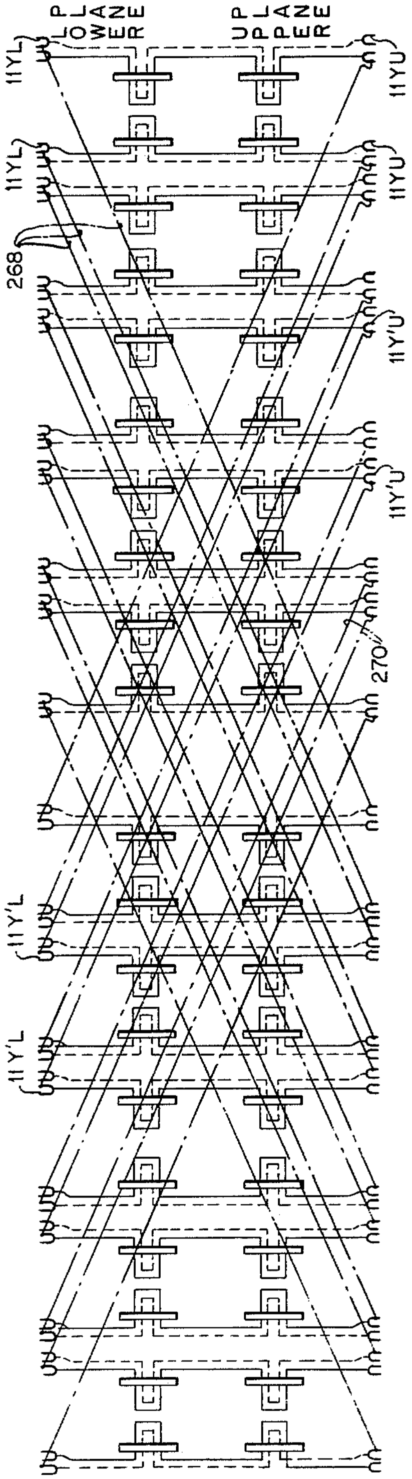

FIG. 31 shows jumper connections for the memory shown in FIGS. 21–29.

Figure 32A:
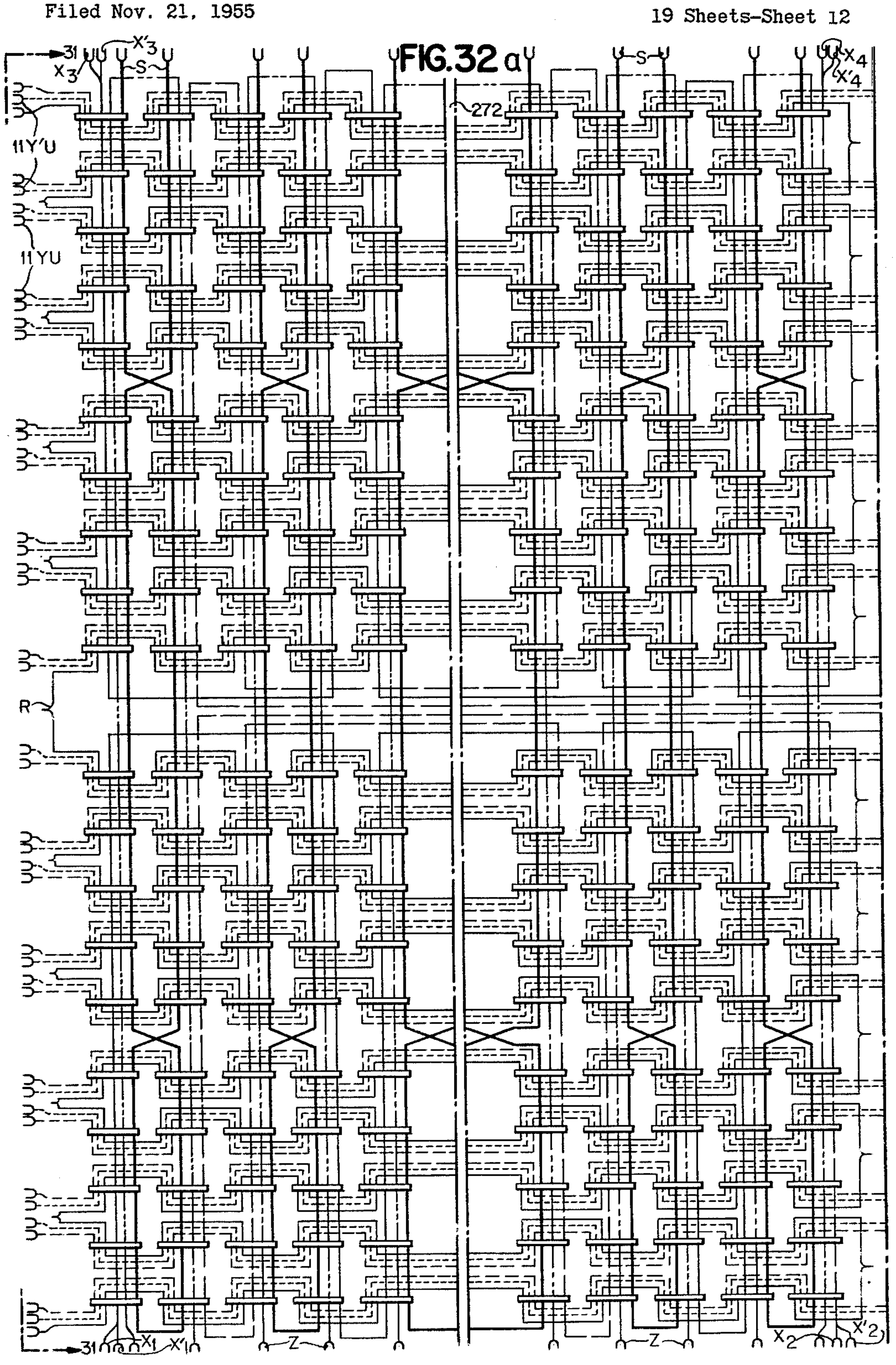
Figure 32B:
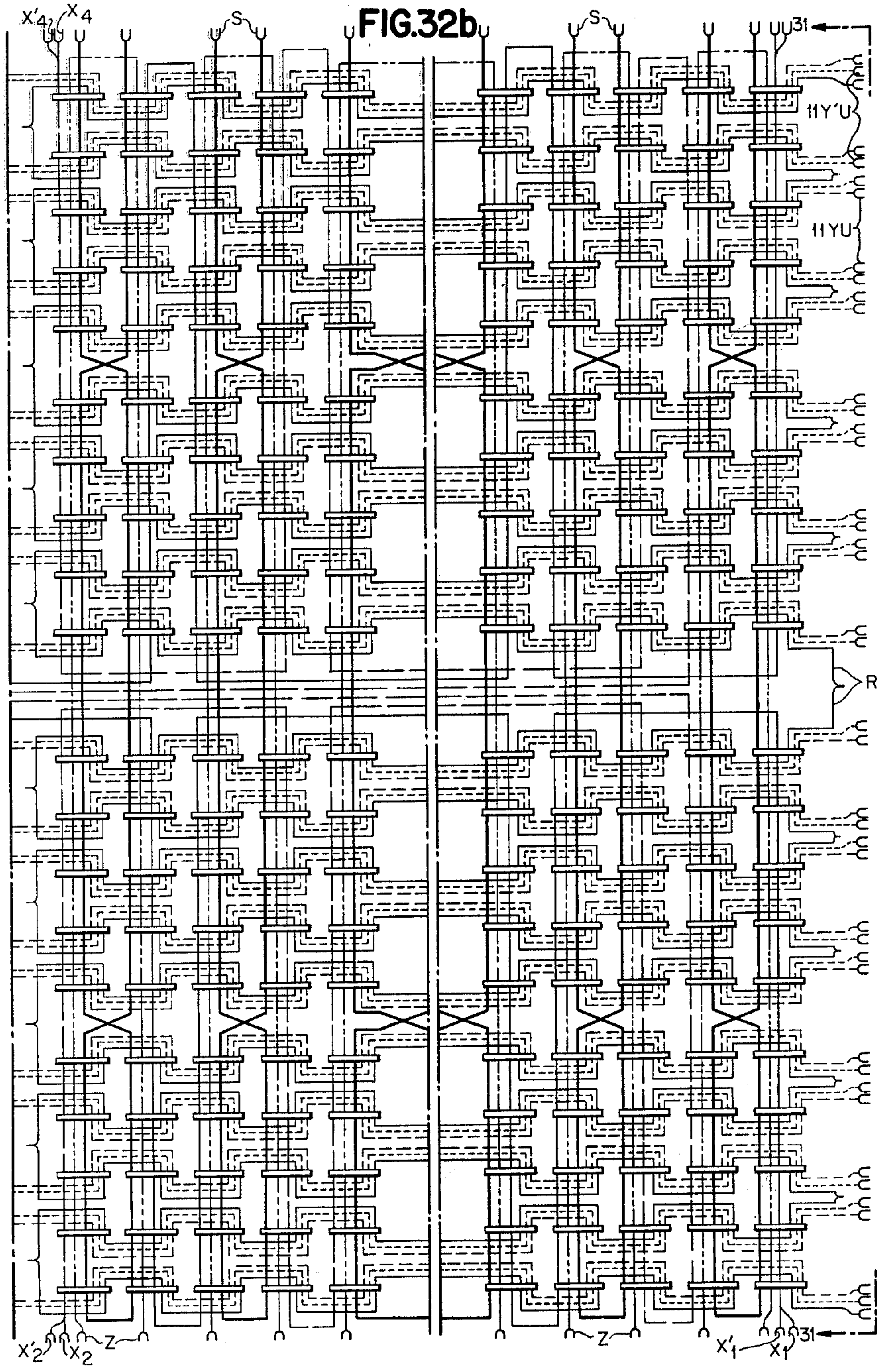

FIGS. 32*a* and 32*b* show the completed memory of FIGS. 21–29.

Figure 33:
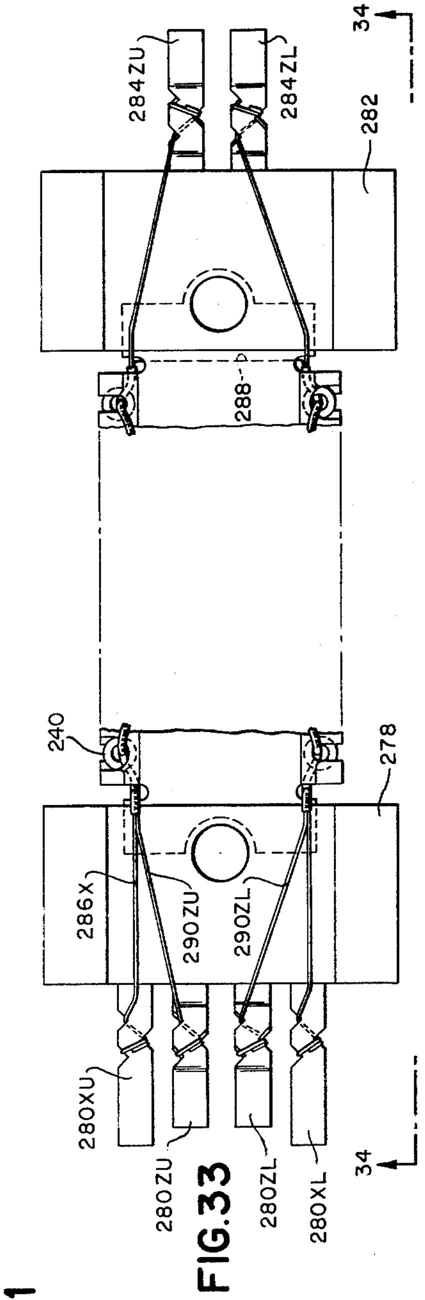
Figure 34:

FIGS. 33 and 34 show another comb member complete with windings, cores and terminals.

FIGS. 35–38 show the successive steps in assembling another core memory.

Figure 37:
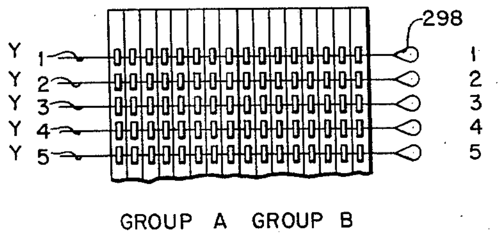
Figure 38:
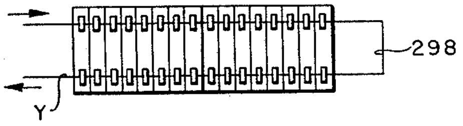
Figures 35, 36, 40:
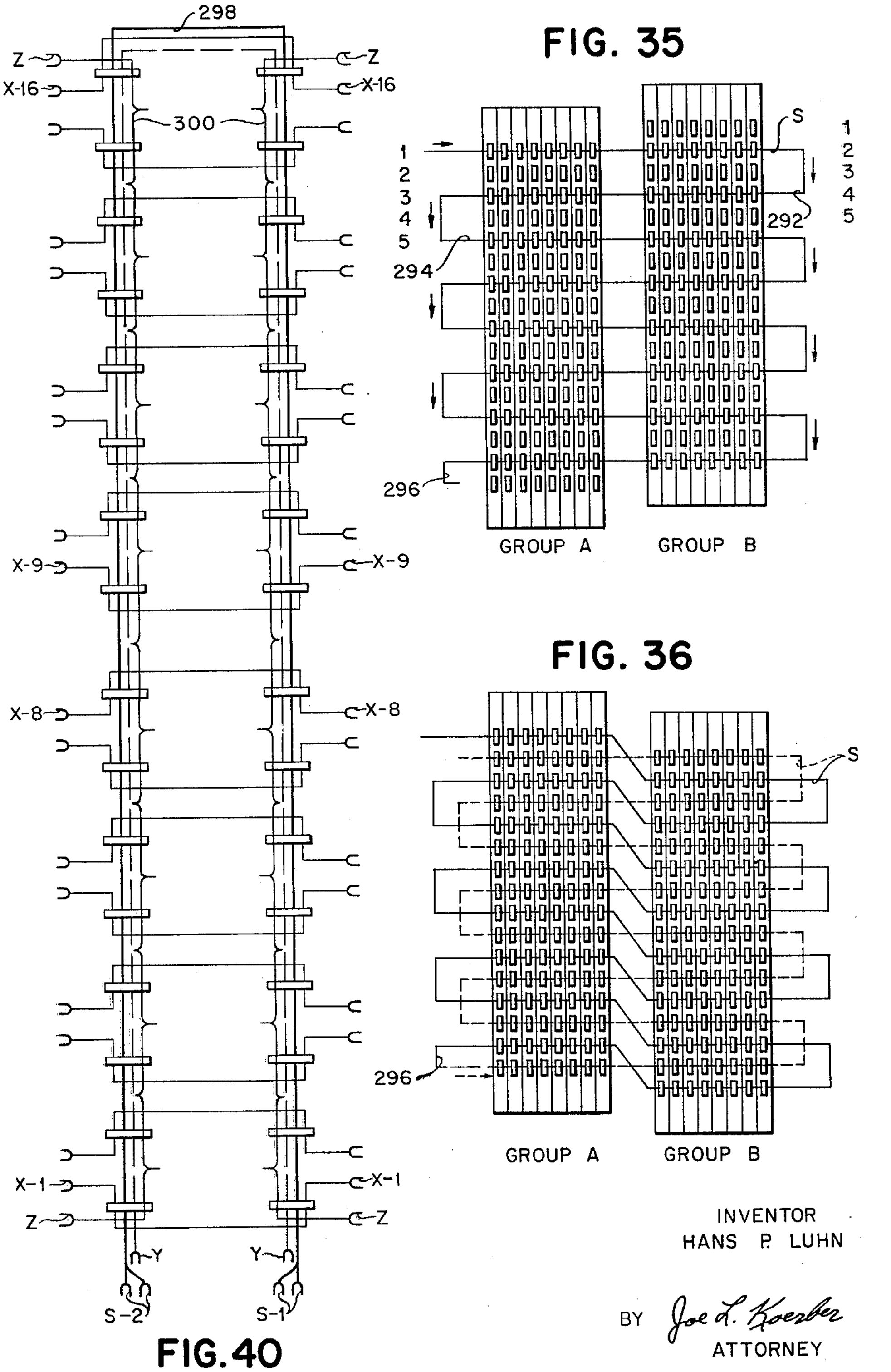
Figure 39:
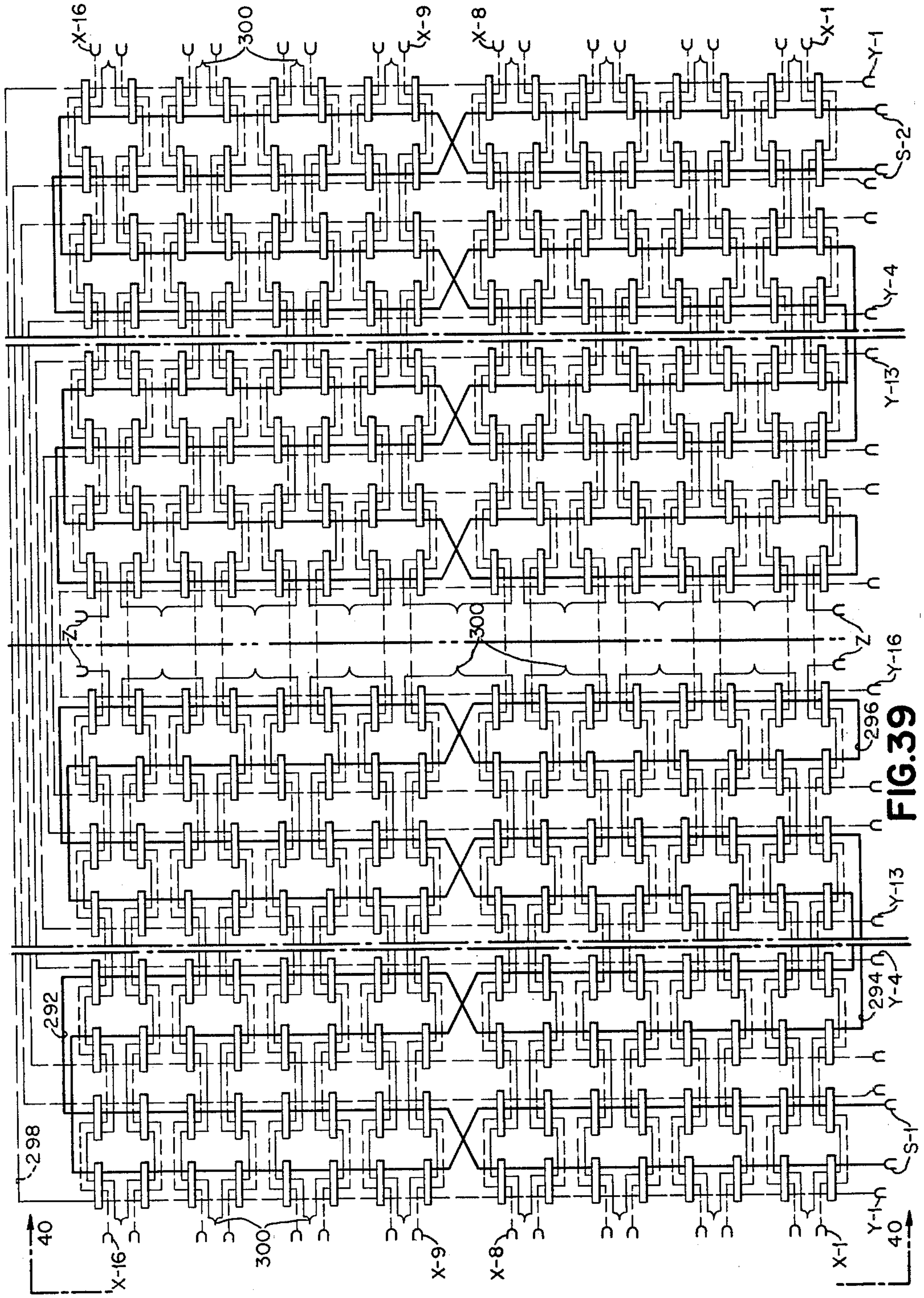

FIGS. 39 and 40 show the completed memory of FIGS. 35–38.

Figures 41, 42, 43, 44:
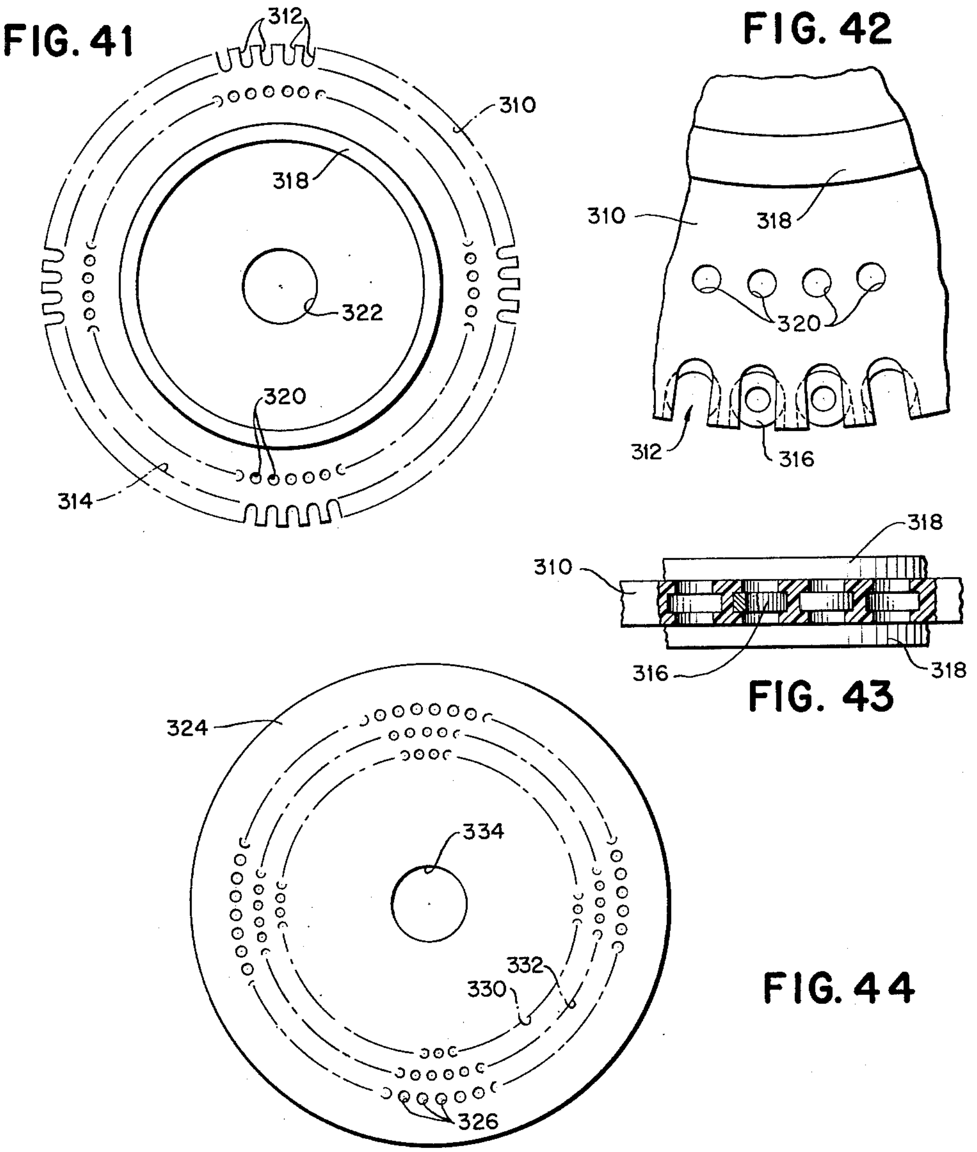

FIGS. 41–43 show circular core mountings.

Figure 45:
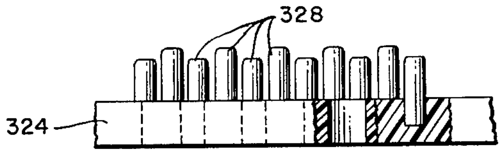

FIGS. 44 and 45 show a circular terminal plate.

Figures 46, 47, 48:
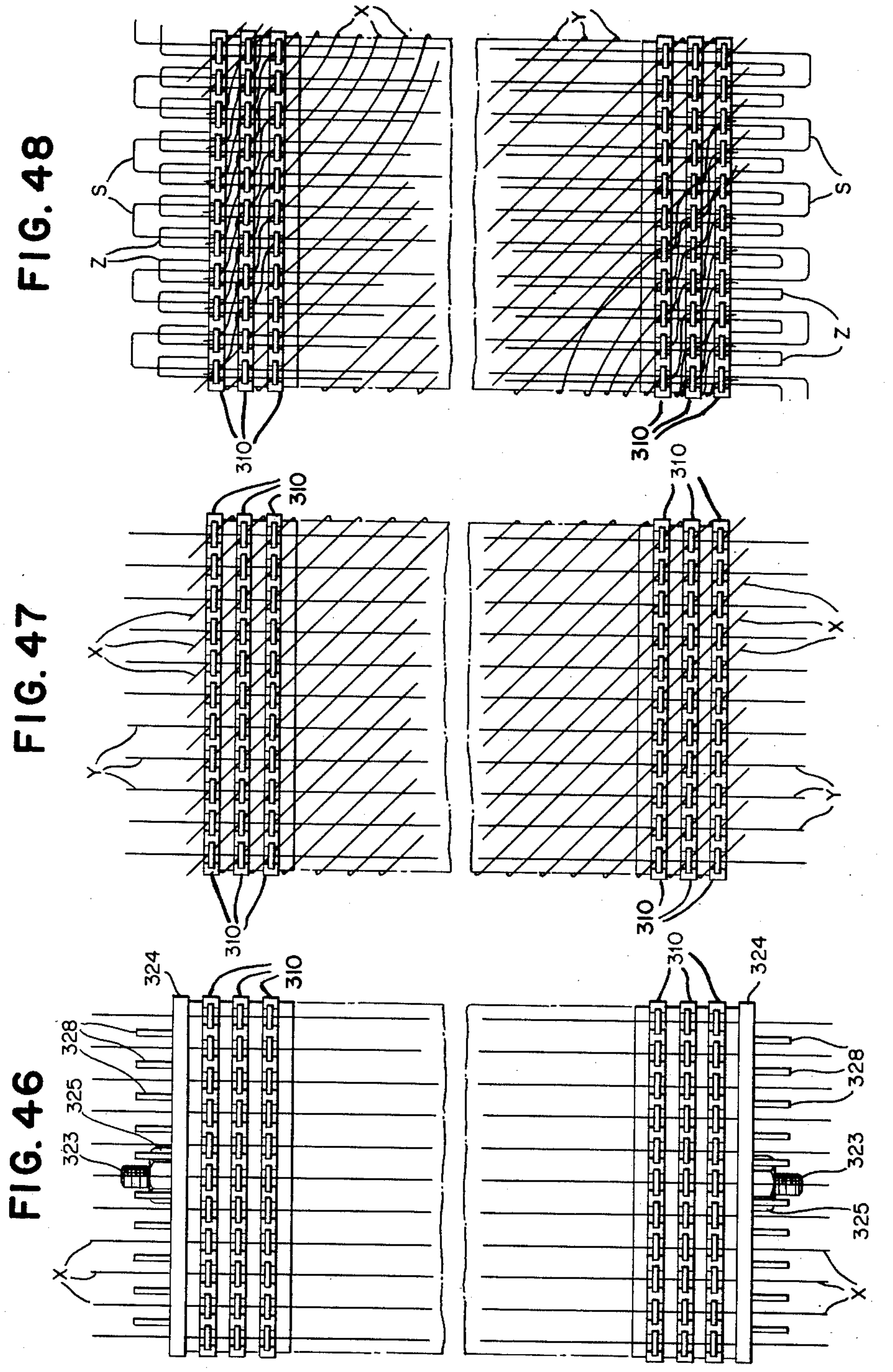

FIGS. 46–48 show the steps of inserting various windings in the cylinder core array.

Figure 49:
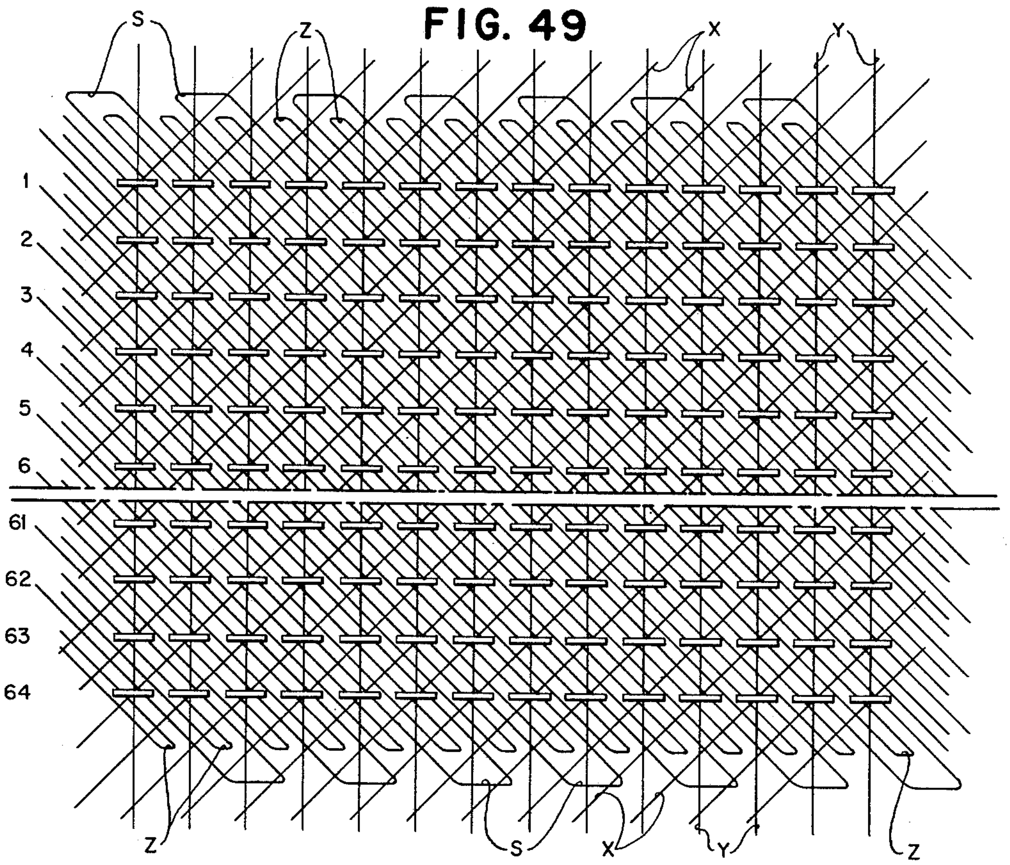

FIG. 49 illustrates schematically the arrangement of core windings in a cylindrical array.

Figure 50:
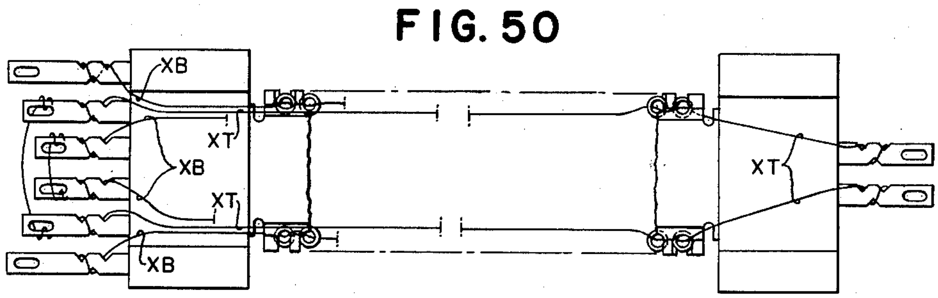

FIG. 50 shows a partial core strip for still another core memory.

Figure 51:
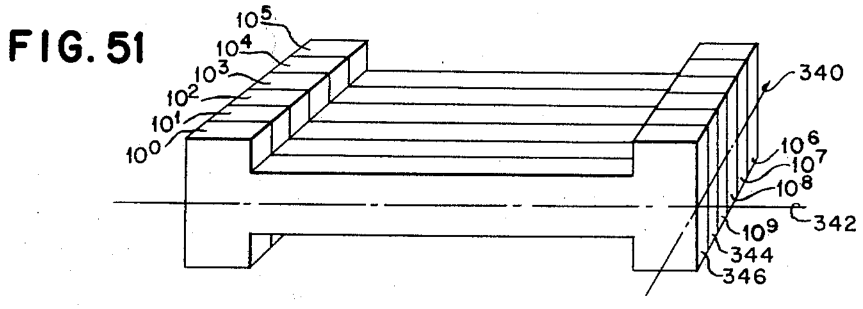

FIG. 51 shows the relationship of the strips of FIG. 51 when arranged as a particular core memory.

Figure 52:
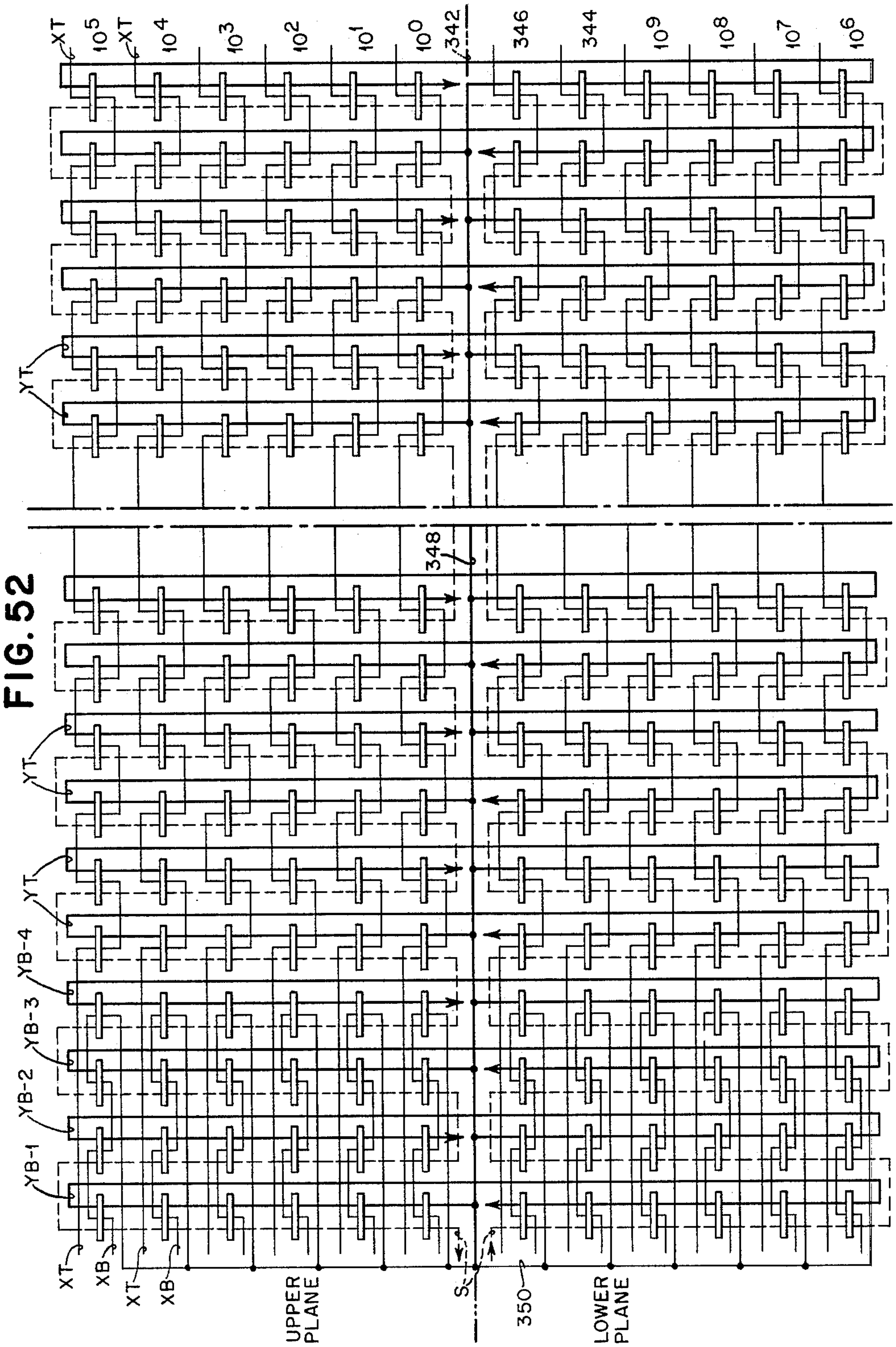

FIG. 52 shows the complete memory of FIGS. 50 and 51.

The apparatus of the present invention is set forth and claimed in my copending application Serial No. 363,658, filed February 25, 1964.

The object of the mechanism shown in FIGURES 1 to 9 is to automatically mount cores and one or more core windings on a core strip or comb such as is shown in FIGS. 14 through 17. The comb may be moulded from any suitable material, for example, one of the styrenes. The comb is generally designated 2 and comprises a body portion 4 and tongue portion 6 at either end of the body portion for affixing terminal units 8 and 10 having variable numbers of terminals 11 and 12 according to the use intended. The comb has core receiving pockets 13 arranged along each edge of the body portion 4, and the pockets open alternately on opposite sides of the comb and are separated by teeth 14. Grooves 15 are formed along the bases of the teeth 14. Holes 16 are provided for inserting rods (not shown) for assembling groups of combs and are surrounded by elevated circular rings 17 for spacing adjacent combs. Similar holes **16*a* are provided in the terminal units 8 and 10**.

Figure 1:
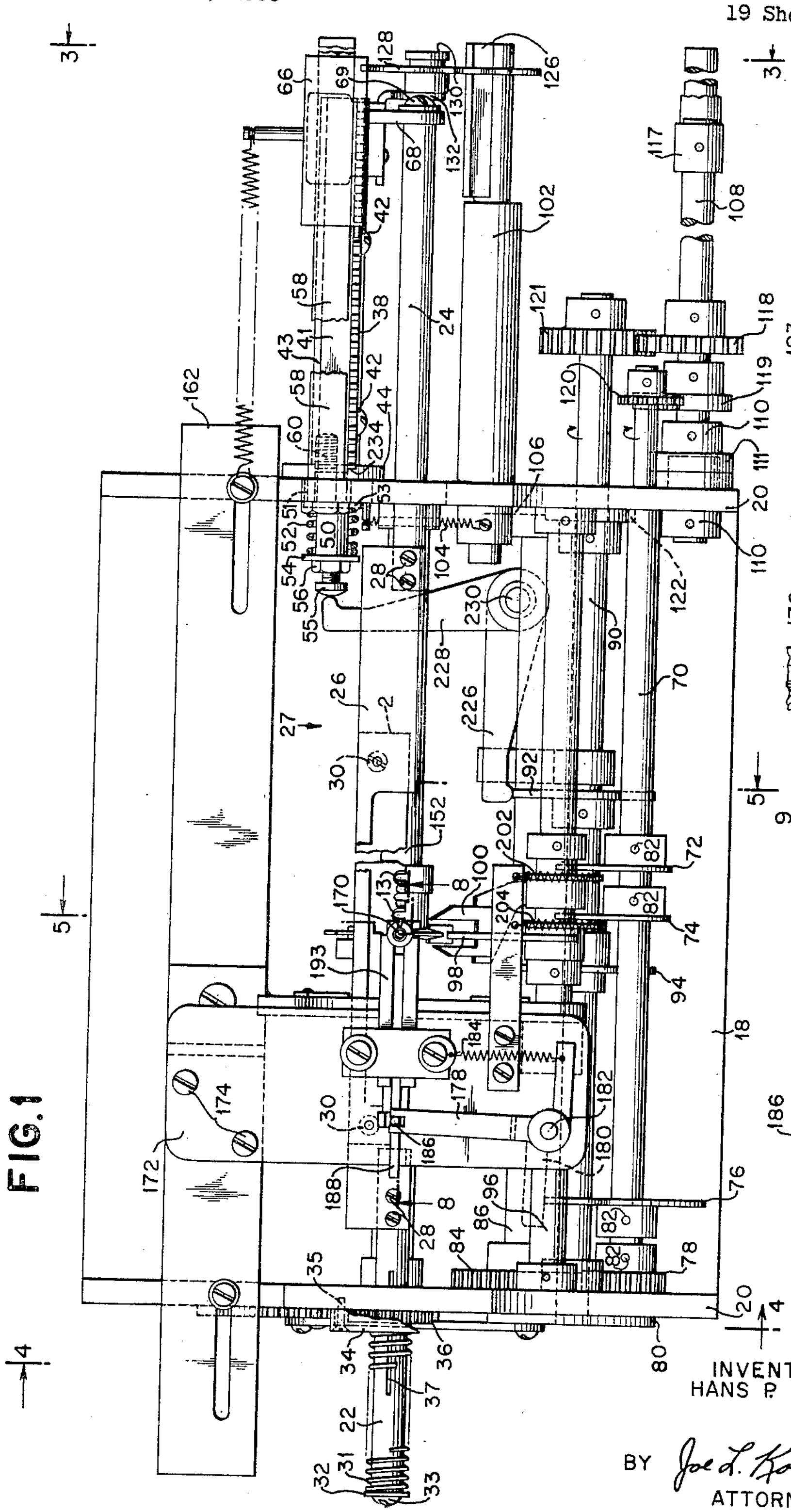
FIG. 1 is a plan view of the device for lacing cores on core supporting strips or combs.

Referring to FIG. 1, a frame comprises a bottom plate 18, and end plates 20. Shafts 22 and 24 are slidably and rotatably mounted in the end plates 20, and are joined at their inner ends by a comb support member 26. The comb support member 26 may be fixed to the shafts 22 and 24, for example, by screws 28. A comb 2 may be fixed to the comb support member 26 by any suitable means, for example, by screws 30, in such a manner that the pockets 13 along one edge of the comb 2 are aligned with the axes of the shafts 22 and 24. The unit comprising the shafts 22 and 24 and the comb support member 26 is generally designated 27 and is biased to the left by a spring 31 retained at the left by collar 32 fixed to the shaft 22 by a screw 33 and retained at the right by a gear cover 34 fixed to the left plate 20 by screws 35 (one shown). A gear 36, shown also in FIG. 4 is slidably mounted on the shaft 22 by means of a slot 37 and a spline not shown.

Figure 2:
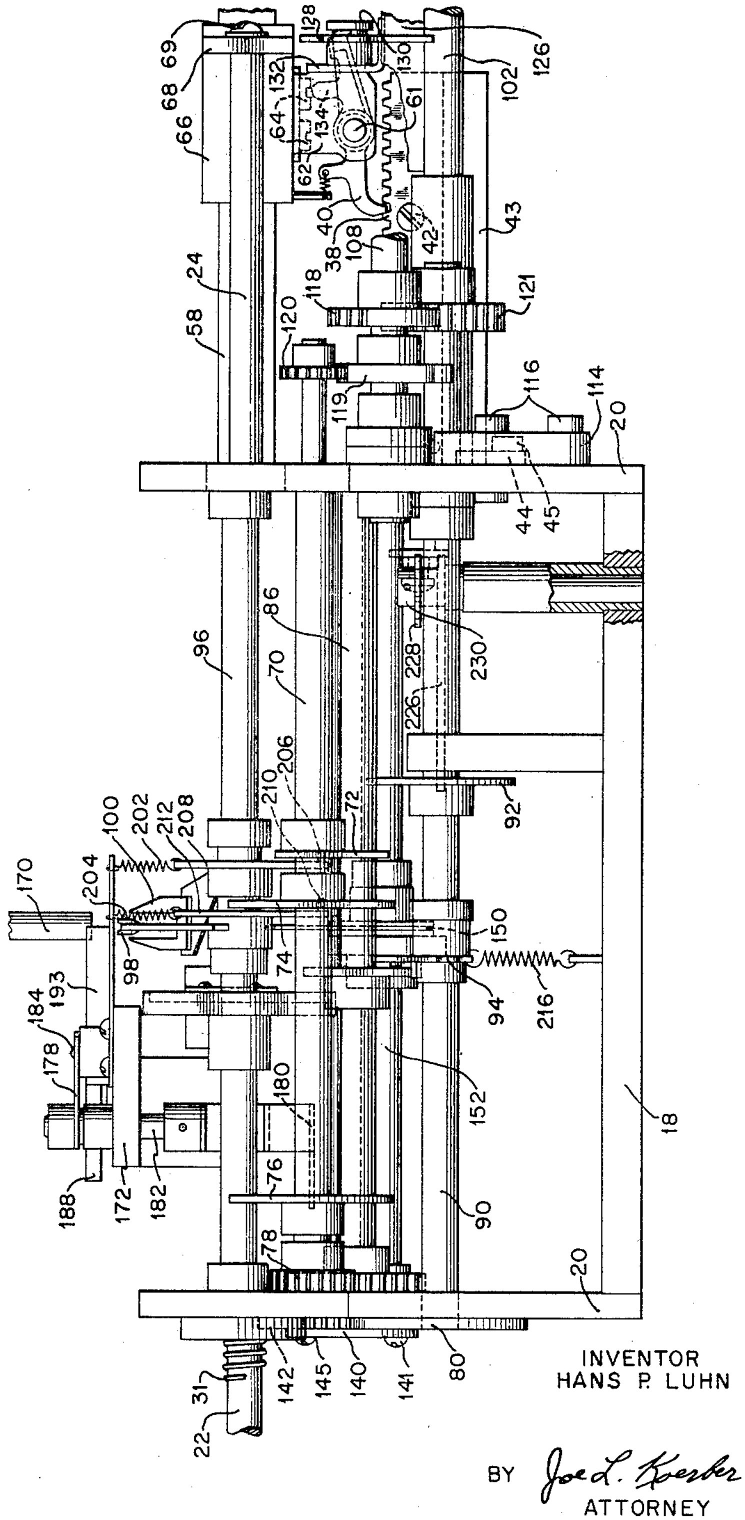
FIG. 2 is a front elevation of the device.
Figures 3, 4:
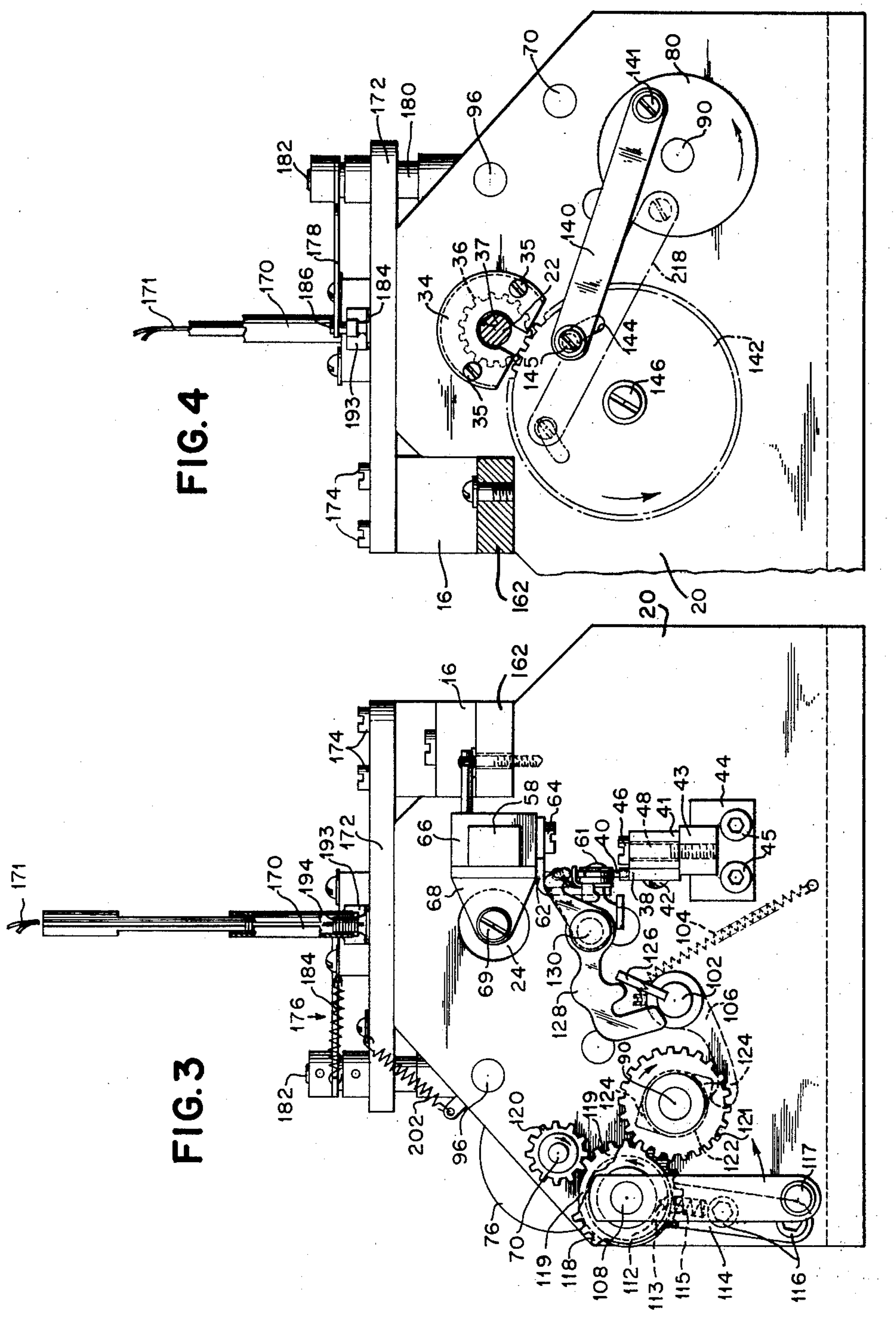
FIG. 3 is a right end elevation taken along the line 3—3 in FIG. 1.
FIG. 4 is a left end elevation taken along the line 4—4 in FIG. 1.

The unit 27 may be indexed by a rack 38, shown in FIGS. 1, 2 and 3, and a dog 40. The rack 38 is fixed to a member 41 by screws 42. The member 41 is slidably supported on a bracket 43 mounted by a flange 44 and bolts 45 to the right frame 20. The member 41 is retained on the bracket 43 by two screws 46 passing through slots 48 in the member 41 and threaded into the bracket 43. The slots 48 allow for a slight longitudinal shifting movement of the rack 38 and the member 41 with respect to the bracket 43. A circular extension 50 of the member 41, shown in FIG. 1, passes freely through a hole 51 in the right end frame member 20. A spring 52, contained at the right end by a collar 53 bearing against the right frame member 20 and at the left end by a collar 54 fixed to the member 50 by a screw 55 and a nut 56, biases the rack 38 to the left. A bracket member 58 is fixed to the right frame member 20 by a bolt 60. The dog 40 is pivotally mounted at 61 on a bracket 62 fixed by bolts 64 to a member 66 slidably mounted on the bracket 58. A flange 68 of the slidable member 66 is fixed to the shaft 24 by a screw 69 and through the rack 38 and the dog 40 controls the movement of the unit 27.

Figure 5:
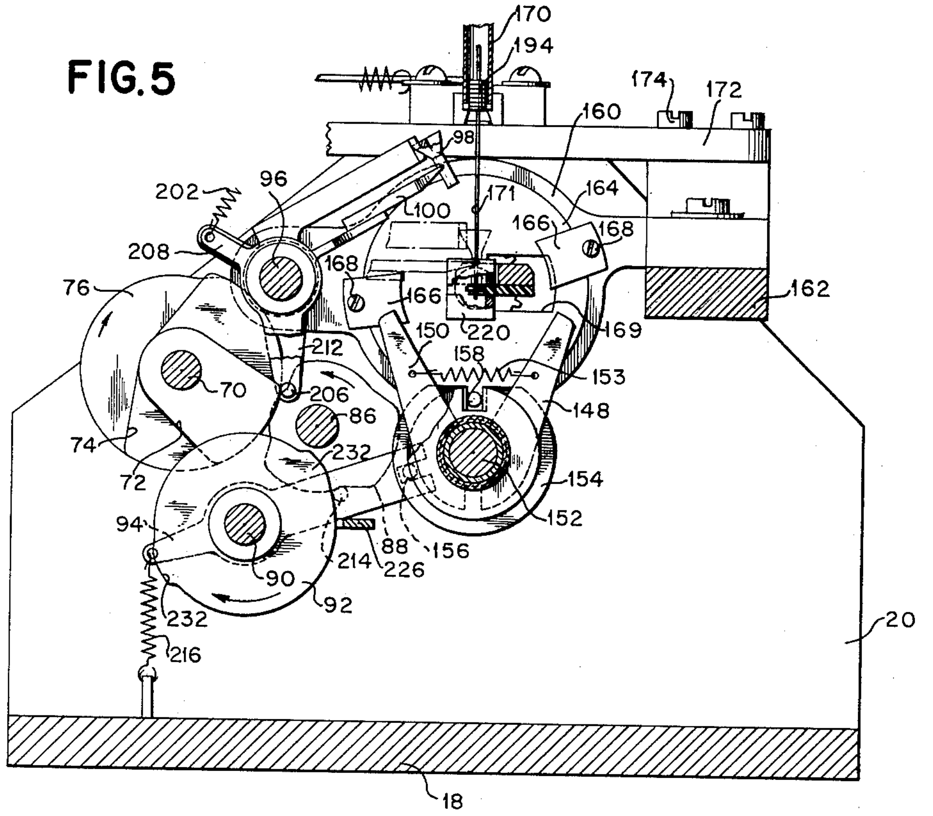
FIG. 5 is a sectional view taken approximately along the line 5—5 in FIG. 1.

A cam shaft 70 is journaled in the frame members 20 and carries cams 72, 74 and 76, a gear 78 and a disc 80. The cams 72, 74 and 76 and the gear 78 are fixed to the shaft 70 by setscrews 82 in their respective hubs. The gear 78 meshes with a gear 84 carried by shaft 86 also journaled in the frame members 20. The shaft 86 carries a cam 88, FIG. 5, also setscrewed to the shaft. A shaft 90 journaled in the frame members 20 carries a cam 92 and a rocker arm 94. A shaft 96, FIG. 5 is journaled in the frame members 20 and carries a vertical core seating member 98 and a horseshoe magnet 100. A shaft 102 is pivotally journaled in the right frame member 20 and is biased in a clockwise direction as viewed in FIGURE 3, by a spring 104 and carries an arm 106.

Referring to FIGS. 1 and 3, a shaft 108 is pivotally journaled in the right frame member 20 and is retained in position by setscrewed collars 110. The outside collar has a portion 111 having a notch 112 in cooperation with a detent 113 supported in a member 114 and biased into engagement with the notch 112 by a spring 115. The member 114 is fixed to the right frame member 20 by screws 116. The shaft 108 carries an operating handle 117 and gears 118 and 119. The gear 119 meshes with a gear 120 fixed to the shaft 70. The gear 118 meshes with a gear 121 fixed to the shaft 90. Gear 118 is partially broken away in FIG. 3 to show the gear 119. It will be noted that the gears 118 and 119 each have teeth on only 180° of their periphery and are so positioned on the shaft 108 that they operate the gears 120 and 121 alternately, one revolution of the shaft 108 turning the gear 120, 360°, whereas one revolution of the shaft 108 turns the gear 121 only 180°. The detent 113 engages as a revolution is completed. The shaft 90 carries a cam 122 having two lobes 124 positioned on diametrically opposed sides of the cam. When the shaft 90 is rotated 180°, one lobe 124 of the cam 122 rotates the lever 106 in a counterclockwise direction on the shaft 102 causing a spline 126 mounted on the shaft 102 to rock a lever 128 in a clockwise direction about its pivot 130 which is fixed to a flange 132 of the bracket 62. A member 134, as well as the dog 40, is pivotally mounted at 61 on the bracket 62. The member 134 and the dog 40 are normally biased in a counterclockwise direction, as viewed in FIG. 2, in which position the dog 40 engages the rack 38. When the lever 128 is rotated in a clockwise direction, as described, it rotates the member 134 in a clockwise direction against the spring bias thereby raising the dog 40 from engagement with the rack 38 and permitting the member 66, which supports the dog 40, to advance to the left. The operation of the lever 128 is timed to permit a single tooth escapement of the dog 40. As the dog 40 escapes one tooth to the left, the unit 27 advances one comb pocket to the left.

Referring to FIGURE 4, an arm 140 is pivotally joined to the disc 80 in an eccentric position by a screw 141. The opposite end of the arm 140 is pivotally and eccentrically joined with a gear 142 by means of a slot 144 and a screw 145. The gear 142 is journaled in the left frame member 20 by means of a stud and screw 146 and meshes with the gear 36 on the shaft 22.

Referring to FIGURES 5 and 6, pusher arms 148 and 150 are freely mounted on a shaft 152 and are biased toward one another by a spring 153. The shaft 152 is fixed in the frame members 20 and carries arms 148 and 150 on individual hubs. A disc 154 also is freely mounted on the shaft 152 and carries pins 156 and 158 eccentrically mounted thereon.

Referring to FIG. 5, an annular bearing member 160 is supported by the shaft 96 and by a frame member 162 fixed to the end members 20. An insert 164 is rotatably mounted in the annular member 160 and is retained therein by members 166 and screws 168. The unit 27 with its comb 2 passes through a cutout 169 in the circular insert 164 which rotates with the unit 27.

A core magazine 170, containing a plurality of cores threaded on one or more wires 171, is mounted on a bracket 172 fixed to the frame member 162 by screws 174. Also mounted on the bracket 172 is a core pusher mechanism generally designated 176 and shown in greater detail in FIGURES 8 and 9. An upper lever arm 178 and a lower lever arm 180, shown in FIG. 1, are fixed to a shaft 182 which is pivotally mounted on the bracket 172. When the cam 76 rotates, the lever 180 which is biased in a counterclockwise direction by a spring 184, is pivoted in a counterclockwise direction about its shaft 182 and the lever 178 also rotates in a clockwise direction. The arm 178 has a bifurcated end, best shown in FIG. 1, which engages a pin 186 mounted on a slide member 188 (see FIG. 8). A slide member 190 is joined to the slide 188 by a welded block 192. The slides 188 and 190 are slidably supported in a channel member 193. When the arm 178 is rotated in the counterclockwise direction as described, the slides 188 and 190 are shifted slightly to the left. During operation, a stack of cores 194 rests on the reduced right end of the slide 188 and a single core 196 in the feed position rests on the right end of the slide 190. When the slides 188 and 190 move to the left, the slide 190 moves from under the core 196 which then slides by gravity down the wire 171 and the stack of cores 194 drops onto a surface 200. Upon completion of rotation of the cam 76, the arm 178 is returned to its normal position moving the slide 188 to the right where the reduced end thereof engages the lowermost core 194 pushing it off the surface 200 and permitting it to drop to the position 196 atop the slide 190 preparatory to feeding during the next core feed operation.

The horseshoe magnet 100 and the vertical core feeding element 98 are biased in a clockwise direction by respective springs 202 and 204. Referring to FIGURE 5, as the shaft 70 rotates, a cam follower stud 206 on the arm 208 (partially broken away in FIG. 5) of the horseshoe magnet support follows the surface of the cam 72 and rotates the horseshoe magnet in a clockwise direction about the shaft 96 to a horizontal position centered about the wire 171. As the cam 76 continues to rotate, a core is dropped from the position 196, as described hereinbefore, which follows down the wire 171 and is suspended in the magnetic field of the magnet 100. A cam follower stud 210, FIG. 2, carried by an arm 212 of the vertical core seating member 98, and lying behind the stud 206 in FIG. 5, follows the cam 74 lowering the member 98 to seat the suspended core into a pocket 13 of the comb 2. The cam follower arm 94 carrying a cam follower stud 214 is freely mounted on the shaft 90 and is biased in a counterclockwise direction by a spring 216. A bifurcated end of the arm 94 engages the pin 156 of the disc 154. As the shaft 70 rotates, the shaft 86 is driven through the gears 78 and 84, as described hereinbefore, and the cam 88 is rotated. The stud 214 and the arm 94 follow the contour of the cam 88, rotating the disc 154 in a clockwise direction and rocking the horizontal core seating arm 150 in a clockwise direction to the position shown in FIG. 6, thereby seating the core in a further recess 217 (FIG. 17) in the pocket 13 of the comb 2 while the core is held from above by the core seating element 98. As the shafts 70 and 86 continue to rotate, the magnet 100 and the vertical core seating element 98, following the cams 72 and 74, are restored to their raised positions and the horizontal core pusher 150 is restored to its normal position as shown in FIGURE 5. Another core is dropped from the position 194 to the position 196 preparatory to the threading of the next core into the comb 2. As the shaft 108 continues to rotate, the toothed half of the gear 119 breaks off engagement with the gear 120 and the toothed half of the gear 118 engages the gear 121. As the disc 80 rotates in a counterclockwise direction, as viewed in FIGURE 4, and the arm 140 moves from the dotted position indicated at 218, the shaft 22 is rocked in a clockwise direction tilting the unit 27 and the comb 2 to an angle of approximately 30° from horizontal as shown in FIG. 7*a*. As the disc 80 continues to rotate, the gear 142 is rotated in a counterclockwise direction as the arm 140 moves through the solid position, and the unit 27 is rotated in a counterclockwise direction, as viewed in FIGURE 4. When the comb is in the tilted position, the unit 27 is escaped a distance equal to approximately one-third of a tooth of the rack 38, laying the wire 171 against the right side of the core pocket 13 and adjacent the groove 15. The unit 27 is then escaped a full tooth to the left thereby laying the wire 171 in the groove 15 and aligning the wire near the right-hand edge of the next adjacent pocket 13. The unit 27 and the comb 2 are then rotated back to horizontal and then an additional 180° whereby the comb is again horizontal but facing in the opposite direction as shown in FIG. 7. With the wire 171 thus aligned, there is no snagging of the wire on the comb as the comb is rotated. The unit 27 is then returned approximately one-third tooth distance to the right to align the wire 171 with the center of the next pocket 13 to clear the pocket for the dropping of the next core. The gear 118 then disengages the gear 121 and the gear 119 re-engages the gear 120 and the foregoing operation is repeated. The next core in position 196 is dropped and suspended by the magnet 100, seated by the vertical seating element 98 and then horizontally seated in the pocket 13 by the right-hand horizontal seating arm 148 in a manner similar to the operation of the seating arm 150. The arms 148 and 150 are used alternately due to the alternate 180° rotations of the unit 27 and the comb 2 presenting the pockets 13 alternately to the left and right-hand arms 148 and 150.

Figure 10:
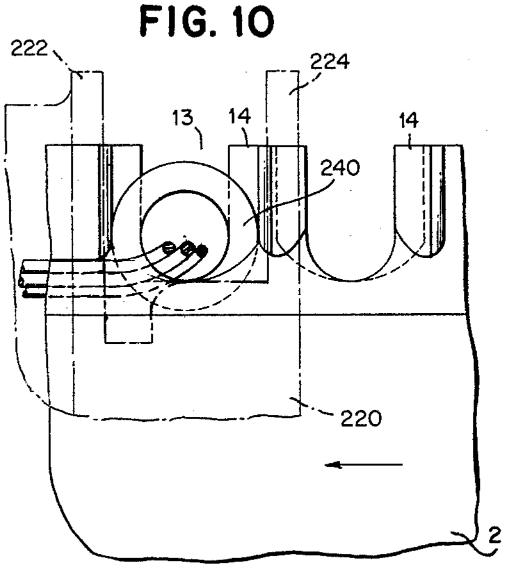
Figure 11:
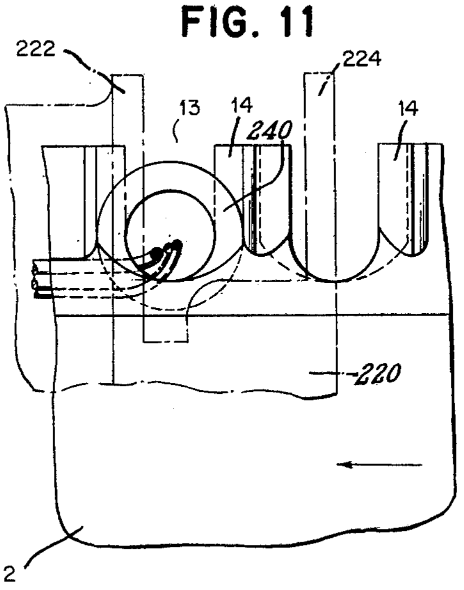
Figures 12, 13:
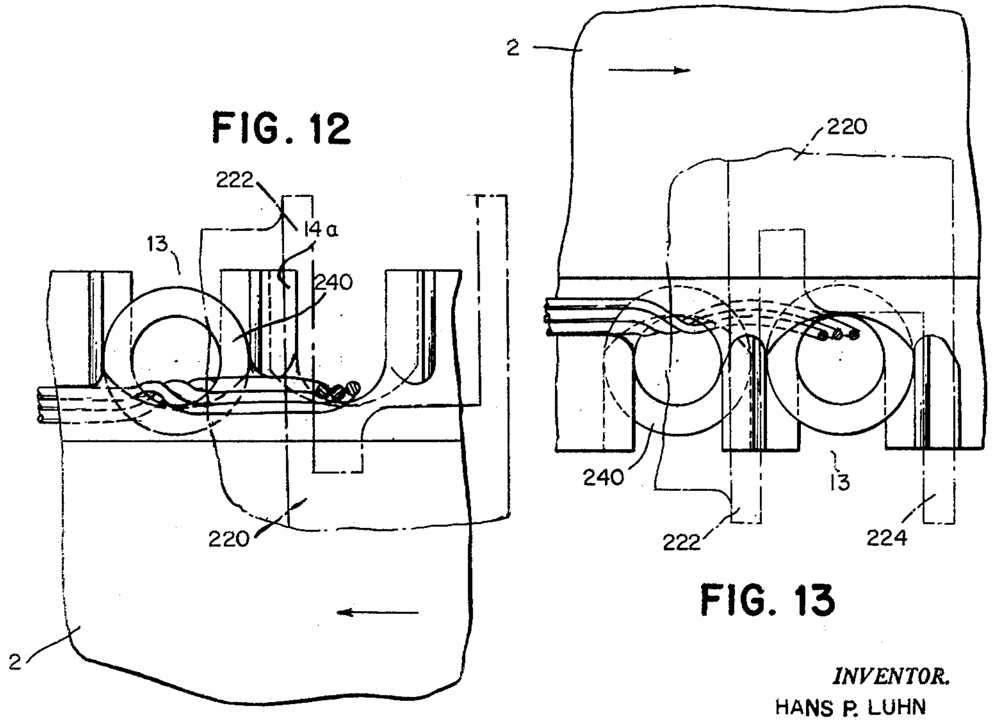

A bifurcated wire guide member 220 having guide fingers 222 and 224 is fixed to the disc 164 and is used to guide the wires 171 during the core winding operation as illustrated in the FIGURES 10 through 13. In FIG. 10, the fingers 222 and 224 of the guide member 220 flank a core pocket 13 in such a manner that a core may be pushed therebetween by the vertical core seater 98 and be operated upon by the horizontal core seater 148 or 150. The one-third tooth escapement moves the comb and seated core to the left in which position, FIG. 11, the finger 222 forces the wires 171 against the right-hand tooth 14 forming the edge of the pocket 13 containing the core. The partial rotation of the unit 27 described hereinbefore, takes place and the wires 171 are aligned adjacent the groove 15. The full tooth escapement then occurs, as indicated in FIG. 12, during which the wire guide 220 lays the wires 171 in the groove 15. The unit 27 is then rotated in the opposite direction, as described hereinbefore, and the one-third tooth escapement to the right is effected to position the comb 2 and guide 220 as shown in FIG. 13, which position corresponds to the position of FIG. 10, except that the pocket 13 now aligned at the core loading position opens to the opposite side of the comb 2. During the rotation from the position of FIG. 12 to the position of FIG. 13, the finger 222 prevents the snagging of the wires 171 on the tooth 14*a*.

The one-third tooth escapement is achieved as follows. Referring to FIGS. 1 and 5, arms 226 and 228 are fixed to a pivotally mounted stud 230. In the position of the cam 92 shown in FIG. 5, the arms 226 and 228 hold the spring loaded member 58 to the right as viewed in FIG. 5. When the cam 92 rotates, the arm 226 drops off the high dwell 232 of the cam 92 and the member 58, no longer held to the right is moved the one-third tooth distance to the left by the spring 52 in which position a surface 234 of the rack 38 stops against the right-hand frame member 20. After 180° of rotation a second and opposite high dwell 232, through the arms 226 and 228, moves the rack 38 one-third tooth to the right.

The foregoing operation laces each core snugly into the comb 2 and the structure is such that the binding effect of the wire is upon the comb teeth and not upon the cores. This manner of binding is highly desirable since it protects the cores against breakage and positions the windings to one side of the cores whereby ample room is provided for insertion of additional windings.

The finished building blocks may be tested prior to incorporation in a core array and thereby reduce the number of faults detected after completion of an array.

*Core Matrix*

Magnetic cores having a rectangular hysteresis characteristic are generally employed for memory purposes and are conventionally arranged in rows and columns with a single turn winding passing through the cores in each individual row and in each individual column to be used for selection of a particular core in a selected plane or group of planes by coincident energization of a single column and a single row winding. Each single plane is provided with a third winding comprising a sense winding that links each core of the plane in one or the other polarity sense or in alternate senses or with half the cores in one sense and half in the other sense so as to balance out the effects of those cores that are only partially excited by one or the other winding during coincident energization of a row and column winding to select a particular core for interrogation. In a three dimensional array, each plane of cores is also provided with a fourth winding conventionally termed the inhibit winding that is selectively pulsed during a write interval to prevent the combined effects of the magnetomotive forces provided by the row and column windings from causing a change in remanence state of the core in that plane when writing or rewriting information or binary characters in the array. In certain instances of application, like positioned cores in the several stacked two dimensional array planes comprise bits of a binary word and the similar row and column windings of each bit plane are series connected so that on energization of these windings in coincidence, the core in each plane linked thereby will attain a one representing remanence state unless inhibited by pulsing the fourth winding individual to that plane.

A single plane of a typical three dimensional array of magnetic cores is shown in FIGURE 20 where cores are shown arranged in rows and columns, as aforementioned, and linked by column windings X and row windings Y. Such an array is illustrated, for example, in an article entitled "Ferrites Speed Digital Computers" by D. R. Brown and E. Albers-Schoneberg, appearing on page 146 of Electronics magazine, issue of April 1953, and described and claimed in the application of E. W. Bauer and M. K. Haynes, Serial No. 443,284 filed July 14, 1954, which application is assigned to a common assignee.

In such an arrangement a particular core is selected for reading by the coincident energization of the particular X and Y selection lines that embrace that particular core. The current pulse on each lie provides a magnetomotive force to each core that it links, which force is less than the coercive force, and the single core energized by both windings then receives double the force. The selected core is thus caused to change from a binary one representing remanence state to a zero remanence state, if it held a binary one representation, and this flux change develops an induced voltage in a sense winding S indicating this fact. If a zero remanence state had been stored in the interrogated core, little flux change will take place and the sense winding signal is of low value so that storage of ones and zeros may be distinguished. Writing or storing a binary one state is similar to a reading operation but with the sense of the X and Y drive pulses reversed to cause the selected core located at the winding intersection to change from a zero remanence state to a one remanence state. This change also induces a voltage in the sense winding S but it is disregarded at write time by means of a gate not shown. Writing a zero may be accomplished in a two dimensional array by failure to apply the X and Y write direction pulses in coincidence and in a three dimensional array, where the X and Y lines link like positioned cores of plural planes to define words of plural bits, the X and Y line pulses may be applied in coincidence but their effect counteracted in selected planes, where zeros are desired, by pulsing an inhibit winding Z in that bit plane. The X, Y, S and Z windings are shown in FIGURE 20 and it is to be noted that the inhibit winding links all the cores in the same sense while the sense winding S links the cores in alternate diagonals in opposite senses. The winding pattern of the sense winding as shown is such as to provide a bidirectional output signal but, since those cores that are linked only by the selected X or the selected Y winding alone are partially excited contribute some output signal on interrogation, the effects of non-selected cores tend to cancel one another. Many other sense winding configurations are feasible wherein the half select signals are counterbalanced.

A reset winding R may be provided linking all cores of one or more planes, the pulsing of which will place all the linked cores in a single remanence state, for example, a zero state.

Hereinafter several core arrays, assembled from the core strips described hereinbefore, will be described in which the conventional windings X, Y, S and Z are wound in a unique manner whereby the difficulty previously experienced in inserting diagonal windings is obviated. Also, by use of double strips (cores arranged along two edges of each strip) many connections which normally would require soldering are eliminated. The form of the offset terminals permits dip soldering and obviates the need for jumper wires between the offset terminals.

One example of a comb 2 is illustrated in FIGS. 14 through 17. A comb member 2 threaded with cores and three wires in the foregoing manner is illustrated in FIGS.

18 and 19. It will be apparent that, when one side of a comb 2 has been laced with cores and wires, the comb may be shifted to align the opposite edge of the comb with the axes of the shafts 22 and 24 and the foregoing operation may be repeated to lace cores along the then aligned edge of the comb. The terminal units 8 and 10 or other suitable units having different numbers of terminals may be fixed by grooves 226, shown in FIG. 14, to the tongues 6 of the combs 2. The wires may then be wrapped around the terminals, as shown in FIG. 18, and dip soldered if desired.

*Double Plane Core Array 20 x 38*

A plurality of strips 2 of the type shown in FIG. 18, are formed into a specific memory units as follows:

The combs used in this particular array accommodate thirty-eight cores 240 along each edge. Three wires RU (Reset Upper), Y (Read) and Y′ (Write) thread the upper row of cores 240 in zigzag fashion best shown in FIG. 19. The wire RU runs from a terminal 11RU, through the thirty-eight cores of the upper row to a terminal 12RU. The windings Y and Y′ start at terminals 11YU (Y Upper) and 11Y′U (Y′ Upper), thread the cores 240 of the upper row, cross over at the right-hand end at 241 and thread through the cores of the lower row to corresponding terminals 11YL (Y Lower) and 11Y′L respectively. A winding RL (Reset Lower) starts at a terminal 11RL and threads the cores of the lower row to a terminal 12RL. The wires are shown in cable form through the cores for simplicity of illustration and actually occupy a smaller portion of the core opening than appears in FIG. 18. The windings shown in FIG. 19 are exaggerated to show their pattern. Actually the windings lie in the groove 15 as described hereinfore and do not protrude beyond the edge of the core strip as appears to be the case in FIG. 19.

The array is wired in such a fashion that the developed view shown in FIGS. 32*a* and 32*b* is formed by splitting the upper core plane from the lower core plane and pivoting the lower core plane in a counterclockwise direction about its right-hand end, in which position the array takes the form of a single plane twenty strips wide by seventy-six cores long.

The terminals 11RU, 11RL, 12RU and 12RL are bent to one side so as to contact oppositely bent corresponding terminals of core strips placed adjacent thereto, as indicated partially in dotted outline in FIG. 19. The openings 243 shown in FIGS. 18 and 19*a* may be utilized where passage of windings **243*a*** through the memory unit are desired without linking any cores.

FIGS. 21 through 29 illustrate a method of assembling a plurality (in this instance twenty) of the core strips into a core memory having a capacity of forty words of thirty-eight bits each. Each core in the completed array is threaded by two coordinate selection windings Y and Y′, by two coordinate selection lines X and X′, by a sense winding S, by an inhibit winding Z and by a reset winding R. The purpose of two Y windings (Y and Y′) and two X windings (X and X′) is that this particular core memory is adapted for use with a transistor drive unit having unidirectional currents. One winding, for example the Y winding (or X winding) is used as a read winding whereas the Y′ winding (or X′ winding) is used as a write winding.

*Sense Winding*

Figure 21:
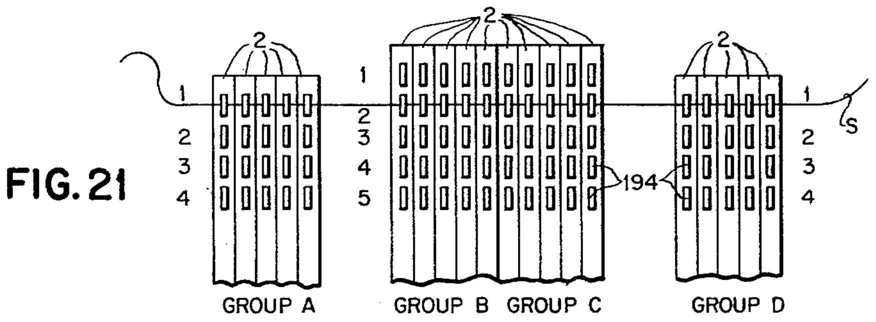
Figure 22:
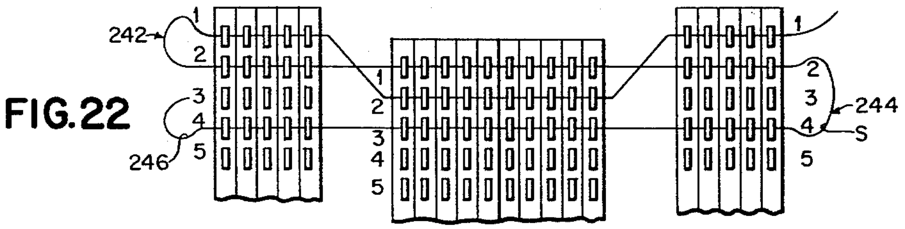

Referring to FIGS. 21 and 22, the method of inserting the S winding is illustrated. It is desired to insert the winding by straight passes through aligned cores, but it also is desired that the S winding link half the cores of each core column in one sense and the other half in an opposite sense so the output signals due to the partial excitation of non-selected cores, as described hereinbefore, cancel each other.

The twenty core strips 2 are divided into four groups of five each. The core strips of each group are placed on edge so as to form an upper row of cores and a lower row of cores. The former row will be in an upper core plane whereas the latter will be in a lower core plane. The four groups of core strips are designated Group A, Group B, Group C and Group D and are positioned as shown schematically in FIG. 21 with the second columns of Groups B and C aligned with the first columns of Groups A and D. In the schematic representation the terminals and the windings Y, and Y' and R are omitted to avoid confusion.

The sense winding S is threaded, for example in the upper plane, from right to left through column one, Group D; column two, Groups B and C; and column one, Group A. Groups B and C are then shifted relative to Groups A and D to align columns one of Groups B and C with columns two of Groups A and D. The sense winding S is looped as at 242 in FIG. 22 and threaded through column two, Group A; column one, Groups B and C; and column two, Group D. Winding S is then looped as at 244 and threaded through column four, Group D; column three, Groups B and C; and column four Group A. The Groups B and C are again shifted to the position of FIG. 21 and the sense winding is looped as at 246 and threaded through column three, Group A, column four, Groups B and C; and column three, Group D. The pattern of shifting and threading is repeated until all columns of the upper core plane are threaded. The lower core plane is threaded in the same manner, either concurrently with the threading of the upper plane or before or after the threading of the upper plane. The loop 244 and all other S winding loops formed on the right-hand side will be cut after all windings of the memory unit are complete to form S winding loops encompassing two columns of cores each as shown in FIGS. **32*a* and 32*b***. A jig may be provided to facilitate the alternate positioning of Groups A, B, C and D.

*Coordinate Windings X and X'*

Figure 23:
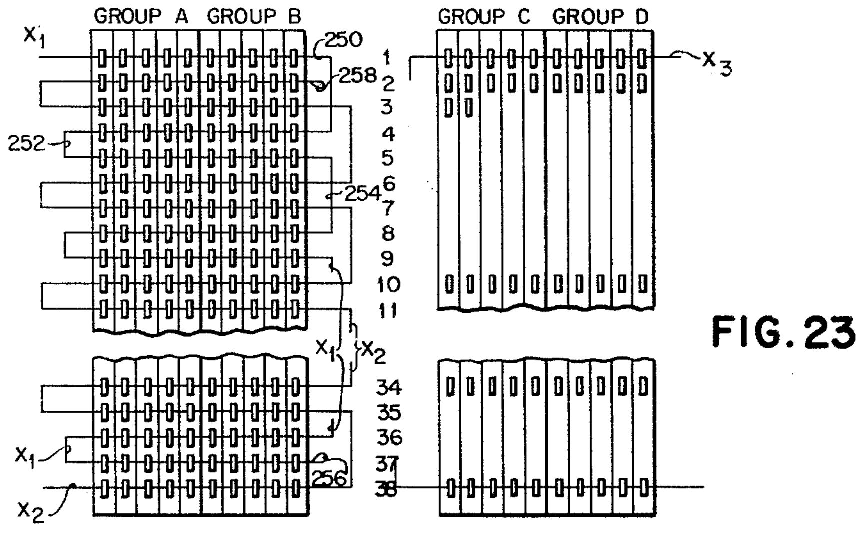
Figures 24, 25:
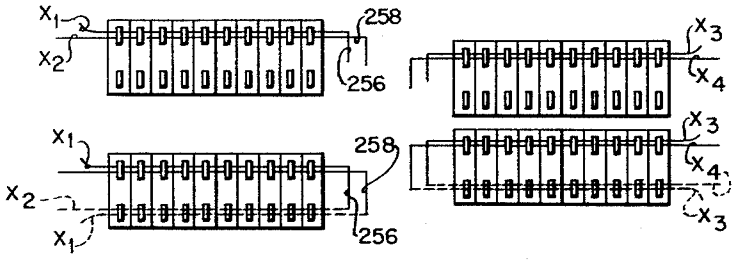

Referring to FIGS. 23, 24 and 25, the method of inserting the X windings is illustrated. Again it is desired to insert the windings by straight passes of the wire through cores aligned in columns. Group B is moved, on the sense winding S, to a position adjacent Group A, as shown in FIG. 23, and Group C is moved to a position adjacent Group D. Coordinate windings X are first inserted in Group A–B, and other X windings are then inserted in Group C–D. Two X windings $X_1$ and $X_2$ are shown in FIGS. 23, 24 and 25 for simplicity of illustration. Actually winding X, comprises a read winding $X_1$ and write winding $X_1'$ corresponding to the read and write windings Y and Y'. Winding $X_2$ comprises a read winding $X_2$ and a write winding $X_2'$.

Group A–B is shifted slightly above Group C–D, as shown in the end view FIG. 24, so straight passes of the X windings may be made through the upper plane of Group A–B without interference from Group C–D. Referring to FIG. 23, the winding $X_1$ is threaded as follows: From left to right through the cores of column one; looped at 250; from right to left through column four; looped at 252; from left to right through column five; looped at 254; from right to left through column eight; etc., in the foregoing pattern until the winding $X_1$ emerges at the right from column 37. Winding $X_1$ is then looped at 256 (see also FIGS. 24 and 25), the Groups A–B and C–D are shifted as shown in FIG. 25, and winding $X_1$ is then threaded from right to left through column thirty-seven of the lower core plane. Winding $X_1$ is threaded through columns of the lower plane corresponding to the threaded columns of the upper plane to emerge at the left from column one of the lower plane.

The Groups A–B and C–D are again positioned as in FIG. 24, and the winding $X_2$ is started at the left in column thirty-eight of the top (or bottom) core plane and is threaded in a pattern similar to the $X_1$ winding pattern through the unthreaded columns of the upper plane, looped at 258 and threaded through corresponding columns of the lower plane to emerge at the left from column thirty-eight of the lower plane.

The Group C–D is wound in a similar manner by winding $X_3$ starting at the right in column one of the upper plane and emerging at the right from column one of the lower plane and by a winding $X_4$ starting at the right in column thirty-eight of the upper plane and emerging at the right from column thirty-eight of the lower plane.

*Inhibit Winding Z*

Figure 26:
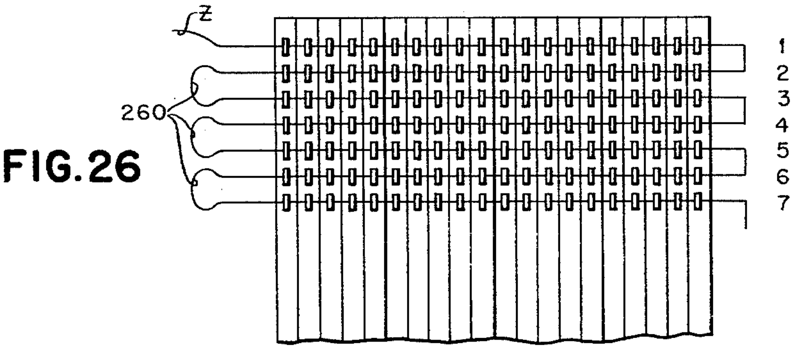
Figure 27:
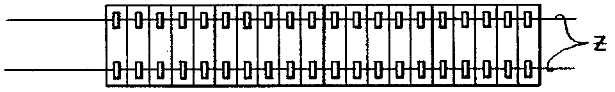
Figure 28:
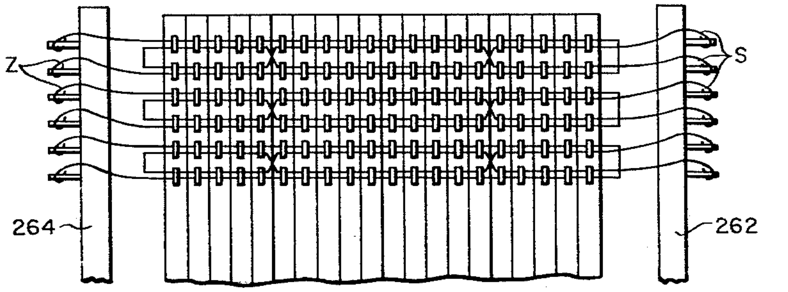
Figure 29:
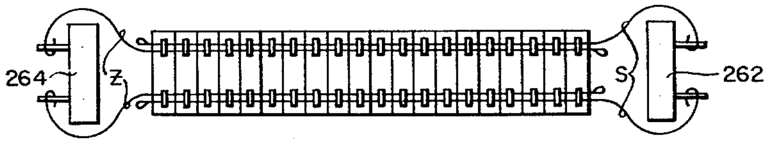

Referring to FIGS. 26 and 27, the method of inserting the inhibit or Z winding, by straight passes of the winding through aligned cores, is illustrated. It is not desired that the Z winding cross over in the manner that the S winding does. Groups A, B, C and D are moved closely adjacent to form a single group with corresponding cores aligned in columns (see FIGS. 26 and 27). The Z winding is threaded from left to right through column one of the upper plane and thereafter alternately from right to left and left to right through succeeding columns of the upper core plane. An identical pattern is threaded by a second Z winding through the lower core plane. Loops of wire are left as at 260 whereas the wires are snugged up to the right-hand strips. The loops at 260 will be cut later to form a plurality of Z loops each linking two adjacent columns of cores and corresponding to the S windings.

*Terminal Blocks*

The X windings were snugged up to the left-hand and right-hand strips of the respective Groups A–B and C–D at the time of insertion. The S windings are now drawn snug at the left-hand edge of the Group A–B–C–D and the loops at the right-hand side are cut in the manner suggested hereinbefore. The Z windings are drawn snug at the right-hand edge of the Group A–B–C–D and the loops at the left are cut in the manner suggested hereinbefore. A terminal block 262 of the type shown in FIG. 30 is placed adjacent the right side of the Group A–B–C–D for affixing the free ends of the S windings and the $X_3$ and $X_4$ windings and a similar terminal block 264 is placed adjacent the left side for affixing the free ends of the Z windings and the $X_1$ and $X_2$ windings.

Holes 266 are provided in the terminal blocks 262 and 264 corresponding to the holes in the core strips whereby the strips and terminal blocks may be bolted together as a single rigid unit by bolts not shown. The S, Z, X, Y and R wires may be dip soldered to their respective terminals and the offset terminals 11RU, 11RL, 12RU and 12RL may be dip soldered to the adjoining corresponding terminals of adjacent core strips.

Referring to FIG. 31, jumper wires 268 are provided to connect the lower plane Y terminals 11YL of each core strip to the upper plane Y terminal 11YU of the core strip which is ten strips removed therefrom, for example strips one and eleven, two and twelve, . . . ten and twenty. Similarly, jumper wires 270 are provided to connect the lower plane Y' terminals 11Y'L of each core strip to the upper plane Y' terminal 11Y'U of the core strip which is ten strips removed therefrom.

The foregoing wiring arrangement, as shown in FIGS. **32*a* and 32*b***, provides a core memory of forty word capacity, each word comprising thirty-eight bits and arranged with two words per row with the bits of the two words interspersed according to a definite pattern.

Word one appears in:

Row 1, Upper plane and Lower plane,
Columns 1, 4, 5, 8, 9, 12, 13, 16, 17, 20, 21, 24, 25, 28, 29, 32, 33, 36, 37.

Word two appears in:

Row 1, Upper plane and Lower plane,
Columns 2, 3, 6, 7, 10, 11, 14, 15, 18, 19, 22, 23, 26, 27, 30, 31, 34, 35, 38.

Odd numbered words are distributed in succeeding rows with the bits appearing in columns corresponding to the columns designated for Word one.

Even numbered words are distributed in succeeding rows with the bits appearing in columns corresponding to the columns designated for Word two.

In FIGS. 32*a* and 32*b*, the double plane 20 x 38 array is shown, broken at 272 and 274 to facilitate illustration by removing a number of cores in each strip. However, the pattern set in the cores and windings shown is followed in the omitted cores. The windings may be dip soldered to their respective terminals and the connections of the reset winding R between strips, as indicated at 276 in FIG. 32*a* are made by dip soldering the offset terminal 11RU, 11RL, 12RU and 12RL where they abut corresponding terminals of adjacent strips.

*Double Plane Core Array 16 x 16*

Referring to FIGS. 33 and 34, a core strip similar to that of FIGS. 18 and 19 is illustrated. The strip in FIGS. 33 and 34 differs in that each core is threaded by only two wires and the left-hand terminal unit 278 has four terminals 280XU (X Upper), 280 ZU (Z Upper), 280 XL (X Lower), 280ZL (Z Lower) the right-hand unit 282 has two terminals 284ZU and 284ZL. An X winding 286X starts at the terminal 280XU, threads the cores of the upper row in the described manner, crosses over to the lower row at 288 and threads the cores of the lower row to the terminal 280XL. The inhibit windings 290ZU and 290ZL start at respective terminals 280ZU and 280ZL and thread the cores of their respective rows to the terminals 284ZU and 284ZL. The developed view of the core array shown in FIG. 39 is formed by splitting the core planes as described hereinbefore for the 20 x 38 array and folding the lower plane out in a counterclockwise direction.

In FIGS. 35–38 the successive steps in inserting the sense line S and the coordinate selection line Y are illustrated. The core strips are schematically represented in the latter figures without the end terminals or the X and Z windings. Referring to FIG. 35, two groups of core strips of the type shown in FIG. 33 and comprising eight strips per group are assembled and placed side by side as in FIG. 35. Again a jig may be provided to aid in positioning and shifting the groups of strips. The groups are designated A and B for ready reference. The odd numbered columns of Group A are aligned with the even numbered columns of Group B. A sense winding S–1 is threaded in the upper plane from left to right through column one, Group A; column two, Group B; looped at 292; threaded from right to left through column four, Group B; column three, Group A looped at 294 and threaded in zigzag fashion through all odd numbered columns of Group A and the corresponding even numbered columns of Group B.

When the last odd column of Group A and the corresponding last even column of Group B are threaded, the S–1 winding is looped at 296; the two groups are shifted to align the even numbered columns of Group A with the odd numbered column of Group B as shown in FIG. 36. The S–1 winding is then threaded in the foregoing zigzag fashion as indicated in dotted outline through the Group A even numbered column and the corresponding Group B odd numbered columns.

A winding S–2 is threaded either before or after or coincidently with the winding S–1 in an identical pattern through the cores of the lower plane.

Referring to FIGS. 37 and 38, the coordinate Y windings are inserted in the core array. Groups A and B are positioned with corresponding columns of cores aligned and individual windings Y–1, Y–2, Y–3, etc. are inserted. For example, winding Y–1 is threaded from left to right through column one of the upper plane (see FIG. 38), looped at 298 and threaded from right to left through column one of the lower plane. The other Y windings are similarly inserted. The windings Y and S may be tied to suitable terminals similar to those of FIGS. 28–30 and be dip soldered thereto. The X and Z windings may be dip soldered to their respective terminals and the Z crossover connections, indicated at 300 in FIG. 39, may also be dip soldered.

The foregoing procedure produces a core array having a capacity of two hundred and fifty-six two-bit words. However, a plurlaity of similar planes may be tied together to form more complex words. Also the same principle may be applied to form arrays having greater word capacity.

FIG. 40 is an end view of the array shown in FIG. 39 showing the various lines and terminals.

*Cylindrical Core Array 64 x 64*

The method of assembling core memory units by passing windings in straight passes through aligned columns of cores may be applied to circular core supporting units as well as to the core strips described hereinbefore. By stacking a plurality of the circular elements and threading wires through the cores supported therein, a cylindrical array may be provided.

Referring to FIGS. 41–43, a single disc shaped core supporting element designated 310 is shown. In the particular array described hereinafter, each disc carries sixty-four cores and comprises sixty-four such discs. Around the periphery of a disc 310, sixty-four equally spaced core pockets 312 are formed, only a few of which are shown in FIG. 41, the remainder being indicated by the dotted circle 314. Enlarged fragments of a disc 310 are shown in FIG. 42 to better illustrate the core pockets 312. Each pocket is recessed along its edges and bottom to snugly receive a core 316. The sides of the pockets are open to permit the passage of core windings through the cores.

A raised ring 318 is formed on each side of the disc 310 to act as spacers for the stacked discs. Holes 320 piercing the disc 310 are arranged in a circle concentric with the outline of the disc. The holes 320 are utilized as described hereinafter for passage of windings from one end of a core cylinder to the other without threading any cores.

A hole 322 is formed in the center of each disc to receive a bolt 323, shown in FIG. 46. Nuts 325 threaded on the bolt 323, clamp the stacked discs together as a unit.

Referring to FIGS. 44 and 45, a circular terminal plate 324 is shown to which the various windings are connected for input and output purposes. A ring of holes 326 corresponding in number and position to the holes 320 in the discs 310 are provided in the terminal plate 324. One hundred and thirty terminals 328 are set in the terminal plate 324 and are arranged in concentric circles 330 and 332. A hole 334 corresponding to the disc holes 322 is provided in the terminal plate 324.

Referring to FIG. 46, one set of coordinate windings, for example the X windings, are inserted in columns of cores formed by aligning cores in the stacked discs 310. In this particular array sixty-four discs are used. It is obvious that the number of discs and the number of cores per disc may be varied to suit specific requirements. After an X winding is inserted in each vertical colunm, the discs are rotated relative to one another to form new columns of cores. Starting, for example at the bottom of the stack of discs, the first disc is held stationary, the second disc is rotated one peripheral core space in, for example, a clockwise direction as viewed from above. The third disc is rotated two core spaces, the fourth, three core spaces, etc. until the sixty-fourth disc is rotated sixty-three core spaces.

In the described rotated positions of the discs, new core columns are formed which are threaded by a set of coordinate windings, for example the Y windings, as illustrated in FIG. 47. It will be noted that in the rotated position, the X windings have assumed a slanted position.

After the Y windings are inserted the discs 310 are again shifted in the manner described hereinbefore causing the X and Y windings to assume the positions shown in FIG. 48. It will be noted that, in parts of FIG. 48, the X windings are not shown and the Y windings are not shown in other parts. These omissions are to relieve confusion which might be caused if the overlapping X and Y windings were shown. However, in FIG. 49 to be described hereinafter, all windings are shown in a schematic representation of a portion of the cylindrical array.

In the columnar position shown in FIG. 48, two windings, a sense winding S and an inhibit winding Z are inserted. Assume that the inhibit winding is to be inserted first. A single inhibit line Z links all cores of the array in the same sense. The line Z is inserted in one column of cores, for example from top to bottom, returned through holes 320 from bottom to top, inserted in a next adjacent column of cores from top to bottom, returned through holes 320 from bottom to top, etc. until all columns of cores have been threaded by the Z winding.

Without further rotation of the discs 310, a sense winding S is to be inserted linking alternate columns of cores in opposite senses. The S winding is inserted in one column of cores, for example from top to bottom, returned through the next adjacent column of cores from bottom to top, returned through the next adjacent column of cores from top to bottom etc. until all columns of cores have been threaded by the S winding.

The upper ends of the X and Y windings may be threaded through the holes 334 of an upper terminal plate 324 and connected to appropriate terminals 328. Similarly, the S (or Z) windings may be connected to two terminals on the upper terminals plate. The lower ends of the X and Y windings may be threaded through the holes 334 of a lower terminal plate 324 and connected to appropriate terminals 328. Similarly the Z (or S) windings may be connected to two terminals on the lower terminal plate.

Variations of these terminal connections are obvious, for example all S and Z winding connections may be on one terminal plate or all connections X, Y, S and Z may be on a single terminal plate provided with sufficient terminals, the lower ends being returned through holes 320. Two or more of the completed cylindrical arrays may be interconnected to form various core memory units.

Referring now to FIG. 49, the illustration is schematic and represents a portion of a developed view of the cylinder of FIGS. 46–48. The directions and positions of the various windings are not intended to be representative of the physical appearance of the cylinder which is more accurately shown in FIGS. 46–48. Rather, FIG. 49 shows clearly the circuit relationship of the windings without distortions due to rotation of the discs.

Referring to FIG. 46, the bolt 323 and nuts 325 are shown fixing the stack of discs 310 together as a single rigid unit.

*Double Plane Core Array 6 x 80*

The core storage unit shown schematically in FIG. 52 may be assembled by use of core strips wound by the herebefore described machine and by using the method of inserting additional windings in straight passes through aligned cores of adjacently positioned core strips.

Referring to FIG. 50, portions of a strip of the type used in the core array of FIG. 52 are shown with the windings XB (X buffer) and XT (X total) partially shown to illustrate their connections with the terminals. A difference from the hereinbefore described core strips may be observed in FIG. 50. The winding of the top row enters the first core from the front side whereas the winding of the bottom row enters the first core from the back side. The difference is necessitated by the fact that the core plane is folded sidewise as contrasted with the endwise folding, in the hereinbefore described arrays. The patterns formed by the wires in the array are clearly shown in FIG. 52. By reference to FIG. 51, FIG. 52 may be oriented. Assume that the unit shown in FIG. 51, comprising six adjacent core strips is cut completely through along the lines 340 and 342 and the lower half or plane is pivoted about the line 342 to assume the position labeled Lower Plane in FIG. 52.

The core array is designed for storage of binary coded decimal numbers (1, 2, 4, 8 code) up to ten digits each, the denominational orders being designated at the right of FIG. 52 as follows: $10^0$, $10^1$, $10^2$, $10^3$, $10^4$, $10^5$, $10^6$, $10^7$, $10^8$ and $10^9$. The row of cores adjacent the order $10^9$ designated 344, is used to store a sign indication and the next adjacent row designated 346 is superfluous but is included to permit the use of six standard core strips.

The capacity of this particular array is nineteen positions of total storage of the type described immediately hereinbefore. In addition to the nineteen positions of total storage, one position of buffer storage is provided having a capacity of ten binary coded digits (1,2,4,8 code). Data are read into buffer storage by means not a part of this invention and later are read out of buffer storage into a selected one of the nineteen total storage positions under control of circuits not a part of this invention.

An individual horizontal drive wire XB is provided for each denominational order of buffer storage. Similarly, an individual horizontal drive wire XT is provided for each denominational order of total storage, each of the latter windings being common to corresponding orders of all total storage positions. The wires XB and XT are wound through their respective cores in the configuration shown in FIG. 52 and are fastened to terminals as shown in FIG. 50. A sense winding S is provided which is common to all cores of the array, both buffer and total storage and is wound in zigzag fashion, first through adjacent rows of the bottom plane, then is crossed over to the top plane and wound in a corresponding zigzag fashion as illustrated.

So-called vertical drive wires YB and YT individual to columns formed by aligned cores of adjacent core strips are provided. Alternate vertical drive wires are wound in opposite directions starting at a common wire 348 and threading correspondingly positioned cores of adjacent strips; for example, four successive vertical drive wires YB–1, YB–2, YB–3 and YB–4, thread respectively the 1, 2, 4, and 8 bit cores of the buffer storage unit. Similarly the 1, 2, 4 and 8 bits of each total storage unit are threaded by individual vertical drive wires YT. The vertical drive wires are inserted so as to link the respective cores in the same sense as the associated horizontal drive wires.

To write data in the buffer storage unit, one or more selected vertical drive wires YB of the buffer unit are pulsed and, through common lines 348 and 350, a selected one of the cores linked by the pulsed vertical drive line YB also is pulsed through its horizontal drive wire XB whereby the magnetic state of the core is changed in one sense. To read data out of the buffer storage unit, the selected vertical drive line or lines YB and selected horizontal drive lines XB are pulsed by a read pulse of polarity opposite the polarity of the write pulse changing the magnetic state of the core in an opposite sense whereby an output pulse is generated on the sense winding S.

To write data in any of the total storage units, the appropriate vertical drive windings YT are pulsed and, through the common lines 348 and 350 and a stepping switch (not shown), the horizontal drive windings XT are pulsed whereby the magnetic state of a selected core is changed. Data is read out of total storage similarly to the reading of data from buffer storage as described hereinbefore.

It will be apparent that the principles of the device disclosed herein may be applied to winding core strips of many sizes and capacities. Also, by applying the methods disclosed herein the core strips may be assembled into core memory units of many sizes, capacities and configurations.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A method of mounting at least one conductive wire, and a plurality of magnetic cores threaded on said wire, upon a comb member having a plurality of core seats in an aligned row and separated by comb teeth, comprising the steps of threading said plurality of cores on said wire, aligning a core seat axially with said wire, seating a core in said aligned core seat, advancing said comb member to align a next adjacent core seat with said wire, rotating said comb member one-half revolutions in alternate directions about an axis transverse to the aligned core centers when said cores are seated in said aligned core seats to wind said wire about one of said comb teeth between said adjacent seats and repeating the foregoing sequence of steps to seat cores in successive ones of said core seats and bind said cores therein by said wire wound about said teeth.

2. A method of mounting at least one conductive wire, and a plurality of magnetic cores threaded on said wire, upon a comb member having a plurality of core seats aligned along at least one edge thereof, said core seats being separated by comb teeth and recessed to receive said cores, alternate ones of said seats opening on opposite sides of said comb member, said seats being recessed laterally to receive the edges of said cores, said comb member being grooved along the base of said teeth and comprising the steps of threading said plurality of cores onto said wire, aligning a core seat axially with said wire, seating a core in first said recess, seating last said core in said lateral recess, laying said wire along one side of one of said teeth adjacent last said seated core and in said groove along the base of last said tooth, rotating said comb member one-half revolutions in alternate directions about an axis transverse to the aligned core centers when said cores are seated in said aligned core seats, thereby aligning a next adjacent core seat with said wire, and repeating the foregoing sequence of steps to seat cores in successive ones of said core seats and bind said cores therein by said wire wrapped around said teeth.

3. A method of assembling an array of magnetic cores comprising the steps of mounting on a core supporting member, a plurality of cores in at least one row of spaced cores having at least a coordinate selection winding threaded through said cores, said winding serving to hold said cores onto said member, assembling a plurality of said members into sub-groups comprising at least one member each, said members being arranged in parallel alignment and having corresponding cores in said members aligned in columns, shifting at least one member and one of said sub-groups relative to other said sub-groups to align non-corresponding columns of said sub-groups, threading a sense winding through said non-corresponding columns, shifting said one sub-group members back to original alignment, whereby when said members are alternately shifted, and aligned cores are threaded, said sense winding links half the cores of a column in one sense and half the cores in an opposite sense, threading other coordinate selection windings through corresponding columns of cores of at least one of said sub-groups.

4. A method of assembling a magnetic core memory comprising the steps of mounting on a core supporting strip a plurality of cores arranged in at least one row and having at least a coordinate selection winding threaded through said cores of said row, said winding serving to hold said cores on said member, assembling a plurality of said strips in parallel alignment and into at least two sub-groups having corresponding cores in said strips within each said sub-group aligned in columns, shifting the strips of at least one said sub-group relative to the other said sub-group in one direction and threading a sense winding through aligned columns of said sub-groups, shifting the strips of said sub-groups relatively in an opposite direction to the original alignment and threading said sense winding through aligned columns of said sub-groups to form group columns having half said cores within said columns linked by said sense winding in one sense and half said cores linked in an opposite sense threading other coordinate selection windings each through columns of at least one said sub-group, and threading inhibit windings in a single sense through corresponding columns of said sub-groups.

5. A method of assembling a magnetic core memory comprising the steps of placing a plurality of cores in strips of material each having means for supporting said cores in alignment along each edge thereof with the number of cores accommodated on each edge corresponding with the number of bits of a desired binary word and each edge forming part of a core plane and threading the cores along each said edge with an individual winding and the cores along both edges with a common coordinate selection winding, said windings serving to hold said cores onto said strips, assembling side by side four equal sub-groups of said strips comprising two inside sub-groups and two outside sub-groups, correspondingly positioned ones of said cores within each said sub-group being aligned in rows, alternately aligning even and odd numbered said rows of said inside pair of said sub-groups respectively with odd and even numbered said rows of said outside pair of said sub-groups and alternately threading a sense winding through said alternately aligned rows of each said plane whereby half said cores in each plane are linked by said sense winding in one sense and half said cores in an opposite sense, forming adjacent pairs of said sub-groups into groups having like positioned cores aligned in rows, shifting the planes of one of said groups out of alignment with the planes of the other of said groups, threading a coordinate selection winding through bit representing cores of one-half of said binary words within said one group, threading a coordinate selection winding through bit representing cores of the other half of said binary words within said one group, threading corresponding coordinate selection windings in a like manner in said other group, forming said groups back again to original alignment into a single unit having corresponding said rows of cores aligned, threading an inhibit winding in zigzag fashion through succeeding ones of last said aligned rows of cores, cutting said sense winding and said inhibit windings to form loops linking corresponding word bits of all words, joining said individual windings of adjacent said strips to form windings in a zigzag pattern through each of said planes, and joining pairs of said common coordinate selection windings having corresponding positions in said groups.

6. The invention of claim 5, wherein other coordinate selection windings are threaded in parallel with said common coordinate selection windings and said coordinate selection windings, whereby each said coordinate winding comprises a unidirectional drive winding.

7. A method of assembling a magnetic core memory having multiple word capacity and two data bits per word comprising the steps of placing a plurality of cores in strips of material each having means for supporting and confining said cores in aligned rows along the edges thereof, each of said rows forming part of a core plane and having partial inhibit windings threaded therethrough individual to said rows and having a coordinate selection winding threaded therethrough common to said rows, said windings serving to hold said cores onto said strips, assembling a plurality of said strips into two equal sub-groups each said sub-group having corresponding cores of said strips aligned in columns, relatively positioning said sub-groups whereby odd numbered columns of one said sub-group and even numbered columns of the other said sub-group are aligned, threading a sense winding in each said plane alternately from left to right and from right to left through the cores of the odd numbered columns of said one sub-group and the aligned even numbered columns of said other sub-group, re-positioning said sub-groups whereby the even numbered columns of said one sub-group are aligned with the odd numbered columns of said other sub-group, threading said sense winding in each plane alternately from left to right and from right to left through the cores of said even numbered columns of said one sub-group and the aligned odd numbered columns of said other sub-group, shifting said sub-groups whereby corresponding columns of said sub-groups are aligned, threading second coordinate selection windings through corresponding columns of said two planes, and connecting the ends of said inhibit windings to form a single inhibit winding in each plane running in zigzag pattern through said rows of cores.

8. A method of assembling a magnetic core memory having a plurality of cores, a plurality of coordinate windings at least two windings being common to each of said cores, a sense winding common to all said cores and an inhibit winding common to all said cores comprising the steps of arranging and confining a plurality of said cores about the periphery of a circular support element, stacking a plurality of said elements to form a cylinder, aligning said cores of said stacked elements to form core columns, threading first coordinate selection windings in each of said core columns, rotating successive ones of said elements, starting with the second one from one end of said cylinder, successive multiples of an increment equal to one peripheral core space whereby differential core columns are formed, threading second coordinate selection windings in each of said differential core columns, again rotating said elements in the foregoing manner to form other differential core columns, threading an inhibit winding lengthwise of said cylinder first inside and then outside successive ones of said core columns whereby all said core columns are linked by said inhibit winding in a single sense, and threading a sense winding lengthwise of said cylinder in zigzag fashion through successive core columns whereby half of said core columns are linked in one sense and half in an opposite sense and said windings serve to hold said cores onto said elements.

9. A method of assembling a magnetic core memory having capacity for at least one multiple digit binary coded decimal number comprising the steps of placing a plurality of cores in a row arranged side by side and threaded in zigzag row fashion by at least one coordinate selection winding in a strip of material having means for supporting and confining said cores in aligned relation along each edge thereof, said winding serving to hold said cores onto said strip, arranging a plurality of said strips adjacent one another to form a two-plane array with related cores superimposed in columns, threading other coordinate selection windings through corresponding columns of cores of said two planes, in the same sense as first said coordinate selection windings, and threading a sense winding in zigzag column fashion first through the cores of one of said planes and then through the cores of the other of said planes by successively zigging through a column of cores of one plane and zagging through the adjacent column of the same plane, etc.

10. A method of assembling a magnetic core memory having a plurality of cores and a plurality of windings comprising the steps of arranging a plurality of cores along the edges of core supporting and confining elements, said windings serving to hold said cores onto said elements, stacking a plurality of said elements, alternately shifting said elements relatively to align selected cores of said elements to form differential columns and threading selected ones of said windings through said cores forming said columns whereby said windings form desired patterns through said cores.

11. A method of assembling a magnetic core memory having a plurality of cores, a plurality of coordinate windings at least two such windings being common to each of said cores, a sense winding common to all said cores and an inhibit winding common to all said cores, comprising the steps of arranging a plurality of cores along the edge of a core supporting and confining element, stacking a plurality of said elements, alternately shifting said elements to align selected cores of said elements in differential columns and threading selected ones of said windings through said cores forming said columns, whereby said windings form desired patterns through said cores and hold said cores in position on said elements.

References Cited in the file of this patent

UNITED STATES PATENTS

| | | |
|---|---|---|
| 1,289,607 | Batchelder | Dec. 31, 1918 |
| 2,045,884 | Sundback | June 30, 1936 |
| 2,192,229 | Johnson et al. | Mar. 5, 1940 |
| 2,226,440 | Parker | Dec. 24, 1940 |
| 2,573,087 | Youngblood et al. | Oct. 30, 1951 |
| 2,700,150 | Wales | Jan. 18, 1955 |
| 2,712,126 | Rosenberg | June 28, 1955 |
| 2,719,965 | Person | Oct. 4, 1955 |
| 2,721,354 | Anderberg | Oct. 25, 1955 |
| 2,724,103 | Ashenhurst | Nov. 15, 1955 |
| 2,743,507 | Kornei | May 1, 1956 |
| 2,746,130 | Davis | May 22, 1956 |
| 2,768,428 | MacGregor et al. | Oct. 30, 1956 |
| 2,823,371 | Jones | Feb. 11, 1958 |
| 2,840,895 | Minock | July 1, 1958 |